(12) United States Patent
Rhodes et al.

(10) Patent No.: US 7,087,691 B2
(45) Date of Patent: Aug. 8, 2006

(54) PHOTO-IMAGEABLE COMPOSITIONS OF NORBORNENE AND ACRYLATE COPOLYMERS AND USE THEREOF

(75) Inventors: Larry F. Rhodes, Silver Lake, OH (US); Larry Seger, Gates Mills, OH (US); Ayusman Sen, University Park, PA (US); April Hennis Marchetti, Ashland, VA (US)

(73) Assignees: Promerus LLC, Brecksville, OH (US); Penn State Research Foundation, University Park, PA (US)

( * ) Notice: Subject to any disclaimer, the term of this patent is extended or adjusted under 35 U.S.C. 154(b) by 0 days.

(21) Appl. No.: 10/614,502

(22) Filed: Jul. 7, 2003

(65) Prior Publication Data

US 2004/0063885 A1 Apr. 1, 2004

Related U.S. Application Data

(60) Continuation-in-part of application No. 09/930,197, filed on Aug. 16, 2001, now Pat. No. 6,593,440, which is a continuation-in-part of application No. 09/565,137, filed on May 5, 2000, now Pat. No. 6,300,440, which is a division of application No. 09/099,070, filed on Jun. 17, 1998, now Pat. No. 6,111,041.

(60) Provisional application No. 60/050,107, filed on Jun. 18, 1997.

(51) Int. Cl.
*G03C 1/492* (2006.01)

(52) U.S. Cl. ............... 526/171; 430/270.1; 522/162; 526/283; 526/308; 526/309; 526/328; 526/329

(58) Field of Classification Search ............. 526/171, 526/283, 308, 309, 328, 329; 430/270.1; 522/162
See application file for complete search history.

(56) References Cited

U.S. PATENT DOCUMENTS

| 3,697,490 A | 10/1972 | Starmer |
| 4,849,488 A | 7/1989 | Starzewski et al. |

(Continued)

FOREIGN PATENT DOCUMENTS

| EP | 0 837 079 | 4/1998 |
| JP | 04063810 | 2/1992 |

OTHER PUBLICATIONS

"New Catalysts for the Polymerization and Copolymerization of Functional Olefins", Ayusman Sen, *Polymeric Materials: Science & Engineering*, 2001, 84, p. 321.

(Continued)

*Primary Examiner*—Bernard Lipman
(74) *Attorney, Agent, or Firm*—Bernard Berman

(57) ABSTRACT

Embodiments in accordance with the present invention encompass photo-imageable compositions that include polymers of acrylate-type monomers and norbornene-type monomers. In some embodiments a catalyst system comprising a cationic or a neutral Pd(II) dimer component having the formula $(Allyl)Pd(P(R^{21})_3)$ or $(L')[(L)Pd(R)(X)]_2$, respectively is employed to effect polymerization. In other embodiments a free radical or living free radical catalyst is employed to effect polymerization. At least one of the acrylate-type monomers and norbornene-type monomers of the polymer embodiments of the present invention encompass an acid labile moiety. Some polymer embodiments of the present invention include more than one type of acrylate-type monomer and norbornene-type monomer. Embodiments of the present invention include forming a patterned layer on a substrate and some embodiments include transferring the patterned structure to a material layer first formed on the substrate.

16 Claims, 5 Drawing Sheets

U.S. PATENT DOCUMENTS

| | | | |
|---|---|---|---|
| 5,585,219 A | * 12/1996 | Kaimoto et al. | 430/270.1 |
| 6,034,259 A | 3/2000 | Brookhart et al. | |
| 6,057,466 A | 5/2000 | Starzewski et al. | |
| 6,111,041 A | * 8/2000 | Sen et al. | 326/171 |
| 6,136,499 A | * 10/2000 | Goodall et al. | 430/270.1 |
| 6,232,417 B1 | * 5/2001 | Rhodes et al. | 526/171 |
| 6,300,440 B1 | * 10/2001 | Sen et al. | 526/171 |
| 6,593,440 B1 | * 7/2003 | Sen et al. | 526/281 |

OTHER PUBLICATIONS

"Neutral Palladium Complexes as Catalysts for Olefin-Methyl Acrylate Copolymerization: A Cautionary Tale", G. Tian, H. Boone, B. Novak, *American Chemical Society, Macromolecules*. 2001, Chapter 34, pp. 7656-7663.

"Block Copolymers by Transformation of Living Ring-Opening Metathesis Polymerization into Controlled/"Living" Atom Transfer Radical Polymerization", S. Coca, Hyun-jong Paik, K. Matyjaszewski, *American Chemical Society, Macromolecules*, 1997, Chapter 30, pp. 6513-6516.

"Mechanistic Studies of the Palladium-Catalyzed Copolymerization of Ethylene and α-Olefins with Methyl Acrylate". S. Mecking, L. Johnson, L. Wang, M. Brookhart, *American Checmical Society* Publication, 1998, Chapter 120, pp. 888-899.

* cited by examiner

PHOTO-IMAGEABLE COMPOSITIONS OF NORBORNENE AND ACRYLATE COPOLYMERS AND USE THEREOF

RELATED APPLICATIONS

This application is a continuation-in-part of Ser. No. 09/930,197 filed Aug. 16, 2001, now U.S. Pat. No. 6,593,440, which is a continuation-in-part of Ser. No. 09/565,137, filed May 5, 2000, now U.S. Pat. No. 6,300,440, which is a division of Ser. No. 09/099,070, filed Jun. 17, 1998, now U.S. Pat. No. 6,111,041, which claims the benefit of U.S. Provisional No. 60/050,107, filed Jun. 18, 1997.

STATEMENT OF GOVERNMENT INTEREST

This invention was made with support from the Government under Grant/Contract number DE/FG02-84ER13295. The Government has certain rights in the invention.

FIELD

This invention relates generally to photo-imageable compositions encompassing copolymers prepared from norbornene-type and acrylate-type monomers, and more specifically to the use of such photo-imageable copolymers in providing pattern transfer to an underlying layer(s).

BACKGROUND

Considerable interest has existed in the copolymerization of acrylates with norbornenes because of the potential benefits of combining the useful properties of the homopolymers of the two monomers. For example, polyacrylates are valued for their extreme hardness and adhesive properties, and are used to form clear, glass-like materials such as Lucite™ and Plexiglas™. In addition, polymers formed using acrylate-type monomers have been found useful in microelectronic fabrication, for example, in advanced photoresist compositions where high-resolution images are desired. Polynorbornenes, on the other hand, are capable of resisting high temperatures and, thus, typically are employed in applications that necessitate high-temperature stability. In addition, polymers formed using norbornene-type monomers have been found useful in microelectronic fabrication, for example, in advanced photoresist compositions where high selectivity during plasma etching processes is desired.

Polymerization of acrylic derivatives is disclosed, for example, in U.S. Pat. No. 4,849,488. In that patent, certain phosphorus compounds are used as polymerization catalysts. Preferred acrylic derivatives that are polymerized in accordance with that patent are acrylates and methacrylates of monovalent and polyvalent alcohols. Copolymers of at least two different acrylic derivatives are also disclosed. There is no disclosure in that patent relevant to the possibility of copolymerizing an acrylic derivative with norbornene or a norbornene derivative or the use of such a copolymer in a photoresist composition.

Some attempts to copolymerize acrylates with norbornenes are known but have met with only modest success. Such modest success has been thought to be a result of a disparity in the mechanisms by which the respective monomers polymerize. U.S. Pat. No. 3,697,490, for example, discloses copolymers of alkoxy alkyl acrylates, alkyl acrylates and substituted norbornene, wherein the copolymers contain only about 0.5 to about 5.5 percent by weight substituted norbornene compounds. The copolymers described in that patent typically are prepared in batch reactions, or the monomers may be proportioned to a reactor containing water and other desired polymerization additives. The patent indicates that best results are generally obtained at polymerization temperatures in the range of 5° C. to 50° C. in the presence of water containing a free radical generating catalyst and surface active agents. There is no disclosure in the '490 patent relevant to the use of the described copolymers for photoresist compositions.

U.S. Pat. No. 6,034,259 broadly discloses a process for polymerizing ethylene, acyclic olefins, and/or selected cyclic olefins, and optionally selected olefinic esters or carboxylic acids. The polymerization reactions are catalyzed by selected transition metal compounds, and sometimes other co-catalysts. Also described in that patent is the synthesis of linear alpha-olefins by the oligomerization of ethylene using as a catalyst system a combination of a nickel compound having a selected alpha-diimine ligand and a selected Lewis or Bronsted acid, or by contacting selected alpha-diimine complexes with ethylene. The '259 patent also discloses polymerization of substituted norbornenes using the disclosed alpha-diimine-containing catalysts systems. However, such patent does not disclose or suggest the use of the described copolymers for photoresist compositions.

Japanese publication JP040063810 relates to copolymers that contain units derived from three essential monomers, namely: (i) an acrylic ester and/or methacrylic ester monomer, (ii) a monomer that possesses a norbornene skeleton, and (iii) a monomer that can be radical-polymerized with the monomer that contains the norbornene skeleton. The copolymers must contain from about 0.5 to about 35 mole % of units derived from radical-polymerizable monomer (iii). The compounds that are disclosed as being suitable for use as the monomer (iii) include esters of maleic acid and an aliphatic alcohol which contains from 1 to 12 carbon atoms, maleic anhydride, N-substituted maleimides, α-cyanocinnamic acid, esters of α-cyanocinnamic acid and an aliphatic alcohol which contains from 1 to 12 carbon atoms, and esters of fumaric acid and an aliphatic alcohol which contains from 1 to 12 carbon atoms. The copolymerization reaction that is described in the Japanese publication typically is conducted in the presence of a free radical polymerization initiator, such as acetyl peroxide, benzoyl peroxide, 2,2'-azobiscyclopropylpropionitrile, or the like. Such publication does not disclose or suggest the use of the described copolymers for photoresist compositions.

Typically, acrylates polymerize in the presence of radical or anionic initiators, whereas norbornenes do not readily follow radical pathways or respond to such anionic initiators. Rather, norbornene-type monomers are typically polymerized by cationic or insertion mechanisms. Therefore, in order to affect the copolymerization of acrylate-type monomers with norbornene-type monomers, it would be desirable to develop processes that would be effective for polymerizing both types of monomers. In addition, it would be desirable to formulate photo-imageable compositions that incorporate acrylate-norbornene polymers formed using any of the available processes for forming such polymers to take advantage of the properties of each monomer.

BRIEF DESCRIPTION OF THE FIGURES

Embodiments of the invention are described below with reference to the accompanying figures.

DETAILED DESCRIPTION

Figure 1:
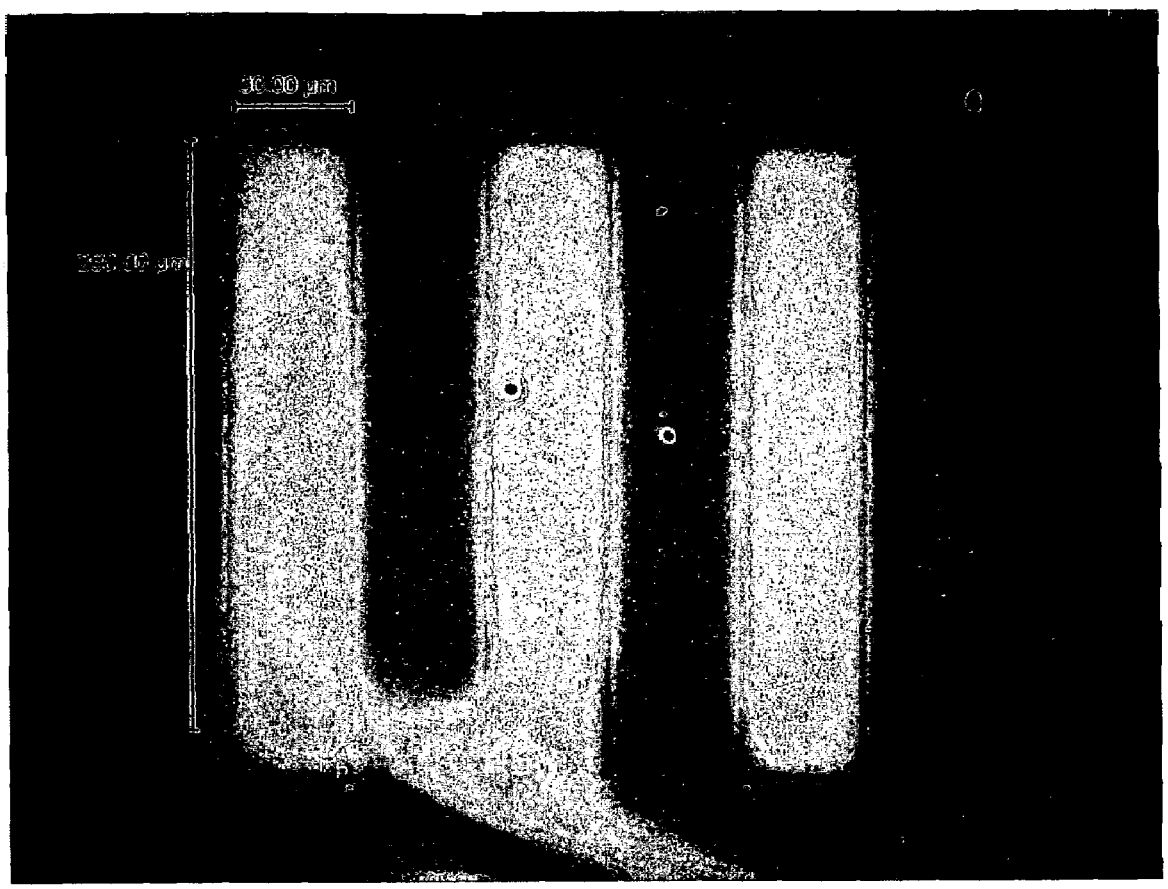
FIG. 1 is a photomicrograph of the photo-imageable composition of Example 36 prepared as described herein below.

Embodiments in accordance with the present invention are described herein below. Such embodiments encompass copolymers of acrylate-type and norbornene-type monomers and are characterized by advantages and properties attributable to the respective acrylate and norbornene monomers from which they are derived. Such copolymers can be tailored in norbornene to acrylate ratio by varying the ratio of the respective monomers in the reaction mixture. Where a neutral or cationic palladium (Pd) based catalyst system is used to initiate polymerization, varying the ligands utilized in the catalyst system can be used for tailoring the norbornene to acrylate ratio to provide a specific set or range of such advantages and properties. Embodiments in accordance with the present invention encompass photo-imageable compositions of such imageable acrylate-type/norbornene-type copolymers that include a photoacid generator (PAG) and a suitable solvent. Such compositions form images as a result of an acid-catalyzed process that is the result of exposing selected portions of the composition to a radiant energy source. In addition, some embodiments also encompass one or more optional additives such as base quenchers, dyes and/or sensitizers, and dissolution rate modifiers (DRMs). Embodiments in accordance with the present invention also include methods of using the aforementioned photo-imageable compositions, for example to form structures from such compositions and to transfer the pattern of such structures to layers underlying such structures.

Some of the imageable copolymer embodiments of the present invention are advantageously prepared by reacting one or more acrylate monomers with one or more norbornene monomers in the presence of a neutral Pd(II)-based catalyst system. While both acrylate and norbornene monomers are necessary to form acrylate-norbornene copolymers, additional monomers can be added to the polymerization mixture, provided that they do not interfere with the desired polymerization. Thus, while there may be some instances where it would be desirable to add monomers that can be radical-polymerized with the norbornene monomer, such as the monomers described above in connection Japanese publication JP040063810 as radical-polymerizable monomer (iii), it is generally more desirable to use the neutral Pd(II)-based catalyst system to prepare the copolymers of embodiments in accordance with the present invention in the absence of such added monomers.

It will be noted that while use of the neutral Pd(II)-based catalyst system mentioned above is desirable for forming the copolymers utilized in the embodiments of the present invention, such acrylate-norbornene copolymers can also be prepared by free radical and living free radical methods as well as cationic Pd(II) systems. Such other catalyst systems are also in accordance with embodiments of the present invention and are described more fully below.

As used in this specification and claims, the terms "acrylate" or "acrylate-type" are meant to include compounds of the general formula $H_2C=CR^6COOR^5$, where $R^6$ is hydrogen, methyl or trifluoromethyl and $R^5$ represents hydrogen or a linear or branched $(C_1-C_5)$alkyl group such as methyl, ethyl, propyl, i-propyl, n-butyl, t-butyl, i-butyl, pentyl, t-pentyl and neopentyl or an aryl group, such as phenyl or p-tolyl and lactones such as tetrahydro-2-oxo-3-furanyl, and tetrahydro-5-oxo-3-furanyl. Other acrylates which may or may not conform to the above formula, but which are nonetheless suitable for use in the present invention and are intended to be included within the scope of the terms "acrylate" and "acrylate-type", include such specific, non-limiting examples as methyl acrylate, ethyl acrylate, n-propyl acrylate, n-butyl acrylate, t-butyl acrylate, acrylamide, 2-hydroxy ethyl methacrylate, methyl methacrylate, acrolein, ethyl methacrylate, acryloyl chloride and phenyl acrylate. In addition, acrylate-type includes compounds in accordance with the above formula where $R^5$ also represents an acid labile moiety selected from $-C(CH_3)_3$, $-Si(CH_3)_3$, $-CH(R^7)OCH_2CH_3$, $-CH(R^7)OC(CH_3)_3$ or the following cyclic groups:

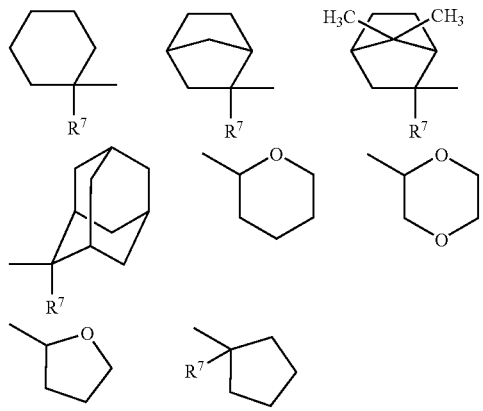

wherein $R^7$ is methyl or ethyl. In the above structures, the single bond line projecting from the cyclic groups indicates the position where the cyclic protecting group is bonded to the acid substituent. Representative groups included in the above structures are 1-methyl-1-cyclopentyl, 1-methyl-1-cyclohexyl, isobornyl, 2-methyl-2-isobornyl, 2-methyl-2-adamantyl, tetrahydrofuranyl, tetrahydropyranoyl, 3-oxocyclohexanonyl, mevalonic lactonyl, 1-ethoxyethyl, and 1-t-butoxy ethyl groups.

The terms "norbornene" or "norbornene-type" are meant to include norbornene, as well as norbornene derivatives, such as norbornadiene and compounds conforming to the general formula:

I

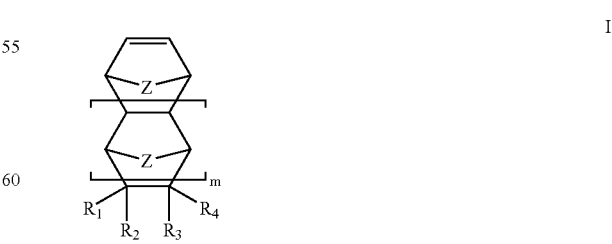

where m is an integer from 0 to 5; and Z represents oxygen, sulfur, $-NH-$, or $-(CH_2)_p-$ where p is equal to 1 or 2. $R_1$ to $R_4$ are substituents independently selected from hydrogen, a halogen (i.e., fluorine, chlorine, bromine, and/or iodine), linear or branched ($C_1$ to $C_{30}$)alkyls, linear or branched ($C_1$ to $C_{24}$)halohydrocarbyls, linear or branched ($C_2$ to $C_{30}$)olefins; —$(CH_2)_nC(O)OR^*$, —$(CH_2)_nC(O)OR'$, —$(CH_2)_nOR$, —$(CH_2)_nOC(O)R$, —$(CH_2)_nC(O)R$, —$(CH_2)_n$ —$OC(O)OR'$, —$(CH_2)_nC(R)_2CH(R)(C(O)OR^{})$, —$(CH_2)_n(CR_2)nCH(R)(C(O)OR^{})$, —$(CH_2)_nC(OR^{***})(CF_3)_2$, —$(CR''_2)nOR$, —$CH_2$—$[O(CH_2)_n]_{m*}$—$C(OR^{*})(CF_3)_2$ and —$(CH_2)_nC(R)_2CH(C(O)OR^{})_2$. Within such substituents, R and R' can be hydrogen or linear and branched ($C_1$ to $C_{10}$)alkyls or hydroxy functional linear and branched ($C_1$ to $C_{10}$)alkyls, R" can be hydrogen or a halogen (i.e., fluorine, chlorine, bromine, and/or iodine); n and m* are each an integer from 0 to 10; R* represents acid labile moieties (i.e., blocking or protecting groups), for example —$C(CH_3)_3$, —$Si(CH_3)_3$, isobornyl, 2-methyl-2-adamantyl, tetrahydrofuranyl, tetrahydropyranoyl, 3-oxocyclohexanonyl and mevalonic lactonyl groups are all exemplary acid labile substituents that are readily cleavable by photoacid generators; R** represents an independently selected R' or R*, where R' and R* are as defined above and R* further includes tertiary ($C_4$ to $C_{20}$)alkyl and cycloalkyl groups, tri($C_1$ to $C_6$)alkylsilyl groups and oxoalkyl groups of 4 to 20 carbon atoms, exemplary tertiary alkyl groups include, but are not limited to, tert-butyl, tert-amyl and 1,1-diethylpropyl, exemplary tertiary cycloalkyl groups include, but are not limited to, 1-methylcyclopentyl, 1-ethylcyclopentyl, 1-butylcyclopentyl, 1-methylcyclohexyl, 1-ethylcyclohexyl, 1-butylcyclohexyl, 1-ethyl-2-cyclopentenyl, 1-ethyl-2-cyclohexenyl, 2-methyl-2-adamantyl, 2-ethyl-2-adamantyl, exemplary trialkylsilyl groups include, but are not limited to, trimethylsilyl, triethylsilyl and dimethyl-tert-butylsilyl and exemplary oxoalkyl groups include, but are not limited to, 3-oxocyclohexyl, 4-methyl-2-oxooxolan-4-yl, 5-methyl-2-oxooxolan-5-yl, tetrahydro-2-oxo-3-furanyl, and tetrahydro-5-oxo-3-furanyl and, R* includes hydrogen, —$CH_2OR'''$, —$(CH_2)_{m}C(O)OR'''$ or —$C(O)R'''$, where R''' can be methyl, ethyl, tert-butyl, cyclopentyl, cyclohexyl or other linear and branched cycloaliphatics and m** is 0 or 1.

In some embodiments in accordance with the invention, at least one of $R_1$ to $R_4$ is either a halohydrocarbyl or a perhalocarbyl group. As used here and throughout the specification, the term halohydrocarbyl means that at least one hydrogen atom on the hydrocarbyl group, e.g. alkyl, alkenyl, alkynyl, cycloalkyl, aryl, and aralkyl groups, is replaced with a halogen atom selected from chlorine, bromine, iodine, fluorine and combinations thereof (e.g., haloalkyl, haloalkenyl, haloalkynyl, halocycloalkyl, haloaryl, and haloaralkyl). The halohydrocarbyl groups can contain 1 to 24 carbon atoms. The term fluorohydrocarbyl means that at least one hydrogen atom on the hydrocarbyl group is replaced by fluorine. The degree of halogenation can range from at least one hydrogen atom being replaced by a halogen atom (e.g., a monofluoromethyl group) to full halogenation (perhalogenation) wherein all hydrogen atoms on the hydrocarbyl group have been replaced by a halogen atom (e.g., perhalocarbyl such as trifluoromethyl (perfluoromethyl)). The fluorinated hydrocarbyl and perfluorocarbyl groups contain, in one embodiment, 1 to 24 carbon atoms. In some embodiments, the fluorinated hydrocarbyl and perfluorocarbyl groups contain 1 to 12 carbon atoms. In some embodiments, fluorinated hydrocarbyl and perfluorocarbyl groups contain 6 carbon atoms and can be linear or branched, cyclic, or aromatic. Such fluorinated hydrocarbyl and perfluorocarbyl groups include, but are not limited to, fluorinated and perfluorinated linear and branched $C_1$–$C_{24}$ alkyl, fluorinated and perfluorinated $C_3$–$C_{24}$ cycloalkyl, fluorinated and perfluorinated $C_2$–$C_{24}$ alkenyl, fluorinated and perfluorinated $C_3$–$C_{24}$ cycloalkenyl, fluorinated and perfluorinated $C_6$–$C_{24}$ aryl, and fluorinated and perfluorinated $C_7$–$C_{24}$ aralkyl. The fluorinated and perfluorocarbyl ether substituents are represented by the formulae —$(CH_2)_qOR^\dagger$, or —$(CF_2)_qOR^\dagger$ respectively, wherein $R^\dagger$ is a fluorinated hydrocarbyl or perfluorocarbyl group as defined above and q is an integer from 0 to 5.

In some embodiments in accordance with the present invention, the perhalohydrocarbyl groups include perhalogenated phenyl and alkyl groups. The halogenated alkyl groups useful in such embodiments are partially or fully halogenated and are linear or branched, and have the general formula $CrX''_{2r+1}$ wherein X" is an independently selected halogen (fluorine, chlorine, bromine and iodine), and r is an integer from 1 to 20.

In some embodiments, the perfluorinated substituents include perfluorophenyl, perfluoromethyl, perfluoroethyl, perfluoropropyl, perfluorobutyl, and perfluorohexyl. In addition to the halogen substituents, cycloalkyl, aryl, and aralkyl groups of such embodiments can be further substituted with linear and branched C1–C5 alkyl and haloalkyl groups, aryl groups and cycloalkyl groups.

For some advantageous monomers in accordance with embodiments of the present invention, m in Formula I is 0. As a result, the general structure of such monomers becomes Formula Ia below:

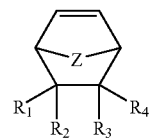

Ia where $R_1$ to $R_4$ and Z are defined as above.

Some exemplary monomers in accordance with embodiments of the invention, represented by Formula Ia where Z is —CH—, have $R_1$, $R_2$ and $R_3$ each being hydrogen and $R_4$ being —$(CH_2)n$—$C(OR^{*})$—$(CF_3)_2$ where R* is as defined above.

Other exemplary monomers in accordance with embodiments of the invention and represented by Formula Ia where Z is —CH—, have $R_1$ and $R_2$ being hydrogen and $R_3$ and $R_4$ being $C_rX''_{2r+1}$ (where X" is independently a halogen selected from fluorine, chlorine, bromine or iodine and r is an integer from 1 to 20).

It should be apparent to those skilled in the art that monomers having readily cleavable acid labile moieties, as defined above, are suitable for embodiments in accordance with the present invention only where the vinyl addition polymerization of such monomers is not substantially inhibited by such moieties.

The neutral Pd(II)-based catalyst system of embodiments in accordance with the present invention is a dimer catalyst that may be characterized by the formula $[(L)Pd(R)(X)]_2$. In this dimer catalyst, L is a monodentate phosphorus or nitrogen ligand; X is an anionic group, such as chlorine or bromine, or a carboxylate, such as acetate, propionate, trifluoroacetate, and benzoate; and R is an alkyl group, such as methyl ($CH_3$), ethyl ($CH_2CH_3$), propyl ($CH_2CH_2CH_3$), n-butyl ($CH_2CH_2CH_2CH_3$), or t-butyl (C—$(CH_3)_3$), or an aryl group, such as phenyl ($C_6H_6$) or p-tolyl ($C_7H_8$). Typically, the catalyst is formed by reaction of one equivalent of the monodentate ligand with [(1,5-cyclooctadiene)Pd(Me)(X)] in situ.

In general, suitable monodentate phosphorus ligands are those that conform to the formula $R^2_3P$, where $R^2$ is alkyl and/or aryl group. Non-limiting examples of such monodentate phosphorus ligands include triphenyl phosphine ($PPh_3$), tricyclohexyl phosphine ($PCy_3$), trimethyl phosphine ($PMe_3$), triethyl phosphine ($PEt_3$), tri-n-propyl phosphine ($P(n-Pr)_3$), tri-n-butyl phosphine ($P(n-Bu)_3$), tri-t-butyl phosphine ($P(t-Bu)_3$) and tri-p-tolyl phosphine ($P(p-Tol)_3$). Specific, non-limiting examples of mixed alkyl and aryl phosphines that are suitable for use in the invention include methyldiphenyl phosphine ($P(Me)(Ph)_2$), phenyldimethyl phosphine ($PPh(Me)_2$), ethyldiphenyl phosphine ($P(Et)(Ph)_2$), and phenyldiethyl phosphine ($PPh(Et)_2$). As well as triisopropylphosphine, tri-sec-butylphosphine, tri-i-butylphosphine, tricyclopentylphosphine, triallylphosphine, trinaphthylphosphine, tri-o-tolylphosphine, tri-o-tolylphosphine, tri-m-tolylphosphine, tribenzylphosphine, tri(p-trifluoromethylphenyl)phosphine, tris(trifluoromethyl)phosphine, tri(p-fluorophenyl)phosphine, trin-trifluoromethylphenyl)phosphine, allyidiphenylphosphine, benzyldiphenylphosphine, bis(2-furyl)phosphine, bis(4-methoxyphenyl)phenylphosphine, bis(4-methylphenyl)phosphine, bis(3,5-bis(trifluoromethyl)phenyl)phosphine, t-butylbis(trimethylsilyl)phosphine, t-butyldiphenylphosphine, cyclohexyldiphenylphosphine, diallylphenylphosphine, dibenzylphosphine, dibutylphenylphosphine, dibutylphosphine, di-t-butylphosphine, dicyclohexylphosphine, diethylphenylphosphine, di-i-butylphosphine, dimethylphenylphosphine, dimethyl(trimethylsilyl)phosphine, diphenylphosphine, diphenylpropylphosphine, diphenyl(p-tolyl)phosphine, diphenyl(trimethylsilyl)phosphine, diphenylvinylphosphine, divinylphenylphosphine, ethyidiphenylphosphine, (2-methoxyphenyl)methylphenylphosphine, tri-n-octylphosphine, tris(3,5-bis(trifluoromethyl)phenyl)phosphine, tris(3-chlorophenyl)phosphine, tris(4-chlorophenyl)phosphine, tris(2,6-dimethoxyphenyl)phosphine, tris(3-fluorophenyl)phosphine, tris(2-furyl)phosphine, tris(2-methoxyphenyl)phosphine, tris(3-methoxyphenyl)phosphine, tris(4-methoxyphenyl)phosphine, tris(3-methoxypropyl)phosphine, tris(2-thienyl)phosphine, tris(2,4,6-trimethylphenyl)phosphine, tris(trimethylsilyl)phosphine, isopropyldiphenylphosphine, dicyclohexylphenylphosphine, (+)-neomenthyldiphenylphosphine, tribenzylphosphine, diphenyl(2-methoxyphenyl)phosphine, diphenyl(pentafluorophenyl)phosphine, bis(pentafluorophenyl)phenylphosphine, and tris(pentafluorophenyl)phosphine.

Generally, monodentate nitrogen ligands which may be used in the present invention are aromatic or heterocyclic amines, such as pyridine, t-butyl pyridine, aniline, trimethyl aniline and imidazole, or compounds that conform to the formula $R_3N$, where R is an alkyl group, such as methyl ($CH_3$), ethyl ($CH_2$ $CH_3$), propyl ($CH_2CH_2CH_3$), n-butyl ($CH_2CH_2CH_2CH_3$), or t-butyl ($C$—$(CH_3)_3$), or an aryl group, such as phenyl ($C_6H_6$) or p-tolyl ($C_7H_8$).

Catalyst formation may be monitored by $^1H$ and $^{31}P\{^1H\}$ NMR. For the $PCy_3$ analog, the movement of the methyl signal in the proton spectrum from a singlet at 1.12 ppm in the starting material to a triplet at 0.11 ppm in the dimer upon addition of 1 equivalent $PCy_3$ indicates the formation of the desired product. Additionally, the appearance of uncoordinated 1,5-cyclooctadiene signals at 5.55 and 2.34 ppm in the proton NMR and a 25.6 ppm $^{31}P\{^1H\}$ NMR signal for $[(PCy_3)Pd(Me)(Cl)]_2$ are observed.

The copolymers of the present invention may be tailored in norbornene to acrylate ratio by varying the ratio of the respective monomers in the reaction mixture and by varying the ligands utilized in the catalyst system. Typically, the ratio of norbornene monomer to acrylate monomer in the starting mixture is from about 100:1 to about 1:100. In some embodiments of the present invention, the ratio of norbornene monomer to acrylate monomer that is added to the reactor is from about 10:1 to about 1:10. By varying the ratio of the norbornene monomer to acrylate monomer in the starting mixture copolymers having a very wide range of acrylate-derived units and norbornene-derived units can be prepared. For example, copolymers containing from about 5 to about 95 mole % acrylate-derived units and from about 95 to about 5 mole % norbornene-derived units may be prepared in accordance with this invention. In some embodiments, copolymers containing from about 15 to about 90 mole % acrylate-derived units and from about 85 to about 10 mole % norbornene-derived units are prepared; and in other embodiments, copolymers containing from about 25 to about 80 mole % acrylate-derived units and from about 75 to about 20 mole % norbornene-derived units are prepared. In still other exemplary embodiments, copolymers containing from about 35 to about 55 mole % acrylate-derived units and from about 65 to about 45 mole % norbornene-derived units are prepared.

The polymerization preferably is carried out in the liquid phase using a solvent, such as dichloromethane ($CH_2Cl_2$), benzene ($C_6H_6$), chlorobenzene ($C_6H_5Cl$) or hexane ($C_6H_{14}$). Other solvents that may be used as the polymerization medium include, for example, pentane ($C_5H_{12}$), toluene ($C_7H_8$), and chloroform ($CHCl_3$).

The polymerization in accordance with this invention may be carried out at temperatures ranging from about 0 to about 200° C. Typically, however, the polymerization will be carried out at a temperature of from about 30 to about 80° C., e.g., about 50° C. The pressure at which the polymerization is carried out has not been found to be critical.

Other palladium containing catalysts useful for making the copolymers utilized in this invention, for example cationic Pd(II) systems, can be prepared as preformed single component catalysts or prepared in situ by admixing a palladium containing procatalyst with an activator in the presence of the desired monomer(s) to be polymerized.

Where a preformed cationic Pd(II) catalyst is desired, it can be prepared by admixing the catalyst precursors, such as a procatalyst and activator, in an appropriate solvent; allowing the reaction to proceed under appropriate temperature conditions, and isolating the preformed catalyst as the reaction product. By procatalyst is meant a palladium containing compound that is converted to an active catalyst by a reaction with a cocatalyst or activator compound. The description and synthesis of representative procatalysts and activator compounds, as well as cationic Pd(II) catalysts formed thereusing, are set forth in U.S. Pat. No. 6,455,650, the pertinent parts of which are incorporated herein by reference.

Exemplary palladium procatalysts suitable for the polymerization of the monomers of the invention are represented by the formula:

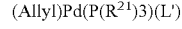

wherein $R^{21}$ is selected from isopropyl and cyclohexyl; and L' is selected from trifluoroacetate, and trifluoromethanesulfonate (triflate). Representative procatalyst compounds in accordance with such formula are (allyl)palladium(tricyclohexylphosphine)triflate, (allyl)palladium(triisopropylphosphine)triflate, (allyl)palladium(tricyclohexylphosphine)trifluoroacetate, and (allyl)palladium(triisopropylphosphine)trifluoroacetate. Other suitable procatalysts are described in the aforementioned '650 patent.

Exemplary activator compounds are selected from lithium tetrakis(pentafluorophenyl) borate (LiFABA) and N,N-dimethylaniliniumtetrakis(pentafluorophenyl) borate (DANFABA). In addition, other suitable activator compounds are described in the aforementioned '650 patent In another embodiment in accordance with the present invention, a palladium compound, for example Pd(OC(O)CH$_3$)$_2$ or Pd(OC(O)CF$_3$)$_2$, a phosphine compound, and the activators, LIFABA or DANFABA referred to above, can be mixed in situ with the desired monomer(s) to be polymerized. Other suitable palladium compounds are described in the aforementioned '650 patent, and other representative phosphine compounds are phosphines such as described for the neutral Pd(II) catalyst system above.

In one embodiment of the invention, the molar ratio of palladium procatalyst (based on the palladium metal) to activator is 1 to 2. In another embodiment, the ratio is 1 to 4, and in another embodiment the ratio is 1 to 1. It should be noted that the order of addition of the various catalyst components mentioned above to the reaction medium has not been found to be important.

Free radical polymerization techniques useful for forming copolymers in accordance with the present invention are set forth in the Encyclopedia of Polymer Science, John Wiley & Sons, 13, 708 (1988).

Generally, in a free radical polymerization process, the monomers are polymerized in a solvent at an elevated temperature (about 50° C. to about 150° C.) in the presence of a free radical initiator. Suitable initiators include but are not limited to azo compounds and peroxides. Representative examples of free radical initiators are azobisisobutyronitrile (AIBN), benzoyl peroxide, lauryl peroxide, azobisisocapronitrile, azobisisovaleronitrile and t-butylhydroperoxide.

In some embodiments in accordance with the invention the free radical catalyst initiators are particularly useful when polymerizing the polycycloolefin monomers set forth under Formula I and/or Formula Ia in combination with a monomer selected from acrylic acid, methacrylic acid, maleic acid, itaconic acid, citraconic anhydride, itaconic anhydride, maleic anhydride, and linear and branched (C1–C5)alkyl esters of acrylic acid, sulfur dioxide, and mixtures thereof.

In some embodiments of the present invention controlled living free radical (LFR) polymerization is employed. Such LFR polymerization offers advantages over traditional free radical techniques such as providing for the formation of polymer products having well-controlled molecular weights with low molecular weight polydispersity and monomer composition. Of the living free radical techniques that have been developed some of the more well-known include, but are not limited to: reversible addition fragmentation chain transfer polymerization (RAFT); atom transfer radical polymerization (ATRP); and iniferter polymerization such as nitroxide-mediated radical polymerization.

It will be recognized that when it is desired to incorporate latent crosslinking moieties into the polymer backbone via free radical or LFR polymerization, care should be taken not select monomers that contain pendant free radically polymerizable carbon-carbon unsaturation, as the polymer will crosslink during the free radical polymerization reaction.

Suitable photo acid generators (PAGs) for embodiments in accordance with the present invention include triflates (e.g., triphenylsulfonium triflate), pyrogallol (e.g., trimesylate of pyrogallol), onium salts such as triarylsulfonium and diaryliodium hexafluoroantimonates, hexafluoroarsenates, trifluoromethanesulfonates, esters of hydroxyimides, α,α'-bis-sulfonyl-diazomethanes, sulfonate esters of nitro-substituted benzyl alcohols and napthoquinone-4-diazides and those PAGs disclosed in Reichmanis et al., Chem. Mater. 3, 395, (1991). Compositions containing triarylsulfonium or diaryliodonium salts are advantageous due to their sensitivity to deep UV light (193 to 300 nm) and are found to give very high resolution images. Of such triarylsulfonium or diaryliodonium salts, unsubstituted and symmetrically or unsymmetrically substituted diaryliodium or triarylsulfonium salts are generally the most advantageous. Photoimageable compositions in accordance with the present invention generally encompass from about 1 to about 100, desirably from about 1.25 to about 50, and preferably from about 1.5 to about 5 parts by weight PAG based upon 100 parts by weight of the polymeric binder or resin.

Photo-imageable embodiments of the present invention contain a solvent prior to their application to a desired substrate. Exemplary solvents that have been found suitable include, but are not limited to, PGMEA (propylene glycol methylether acetate), ethyl lactate, cyclohexanone, and the like, where the solvent selected does not have significant adverse effect on the performance of the photo-imageable copolymer.

Some photo-imageable embodiments in accordance with the present invention can additionally encompass one or more optional components or additives in addition to the aforementioned copolymer, PAG and solvent. Such components include base quenchers, dyes and/or sensitizers and dissolution rate modifiers (DRMs).

Suitable base quenchers include, but are not limited to, tetramethylammonium hydroxide, triethanolamine, triisopropylamine, N-methylpyrrolidone, and the like. Such suitable base quencher additives are generally weak bases which can scavange trace acids generated by the PAG component and thereby improve image resolution and profiles of the photo-imageable copolymer.

Suitable dyes and/or sensitizers are capable of sensitizing the PAG to specific desired wavelengths or ranges of wavelengths that are dependant on the intended application. Such sensitizers include, but are not limited to, polycyclic aromatics such as pyrene and perlene. The sensitization of PAGs is well-known and is described in U.S. Pat. Nos. 4,250,053; 4,371,605; and 4,491,628 which are all incorporated herein, in pertinent part, by reference.

Generally a DRM is used to promote dissolution of radiation exposed portions of the photo-imageable composition applied to the substrate. Some examplary DRM's that are suitable for embodiments in accordance with the present invention include bile acid esters derived from cholic acid, deoxycholic acid, ursocholic acid, lithocholic acid, and the like.

The photo-imageable compositions of the present invention are prepared by combining the imageable copolymer, PAG and solvent with any one or more of the aforementioned optional components or additives using conventional methods. Generally such photo-imageable compositions contain between about 0.5 to 20 wt. % PAG (based on the total weight of the imageable copolymer employed) are initially about 50 to 90 wt. % solvent (based on the total of the photo-imageable composition). Where a base quencher is employed, generally 1 wt. % or less of such additive (based on the total weight of the imageable copolymer employed) is provided. Where a DRM is employed, generally from about 5 to 25 wt. % (based on the total weight of the imageable copolymer employed) is provided.

The general use of the photo-imageable compositions in accordance with embodiments of the present invention as a photoresist composition in photolithography for semiconductors is generally known Typically, the photo-imageable composition containing solvent is applied to the desired substrate using a spin coating technique, although other application techniques can be employed. The substrate with a coating of the photo-imageable composition is then heated (pre-exposure bake) prior to being exposed to a radiation source to remove the solvent. The thickness of the layer after the solvent is substantially removed is generally as thin as possible with the proviso that such thickness is substantially uniform and that the layer is of sufficient thickness to withstand any subsequent processing as may be needed to transfer a pattern to a material layer disposed over the substrate.

After the solvent is substantially removed during the pre-exposure bake, the layer is then exposed to the radiation source where such exposure is controlled to form a pattern therein. For example, where a wavelike radiation form such as ultraviolet radiation is employed, the exposure is conducted through a mask which is placed between the radiation source and the layer such that only selected portions of the layer are exposed to the radiation source. It will be understood that the total exposure energy needed to form the aforementioned pattern is a function of multiple factors, for example the nature of the photo-imageable composition in its entirety, that is to say all of the components thereof, the wavelength of the radiation employed for the exposure and size of the smallest dimension of the pattern being formed and the thickness of the layer. Despite this seemingly complex inter-relationship of factors, it will be recognized that such total exposure energy is readily determined both by routine experimentation and/or by computer modeling, such as are known.

After the layer is exposed, it is typically baked (post-exposure bake) to further complete the acid-catalyzed reaction and to enhance the contrast of the exposed pattern. After post-exposure bake, the layer is contacted with an alkaline solution which selectively dissolves the areas of the layer which were exposed to the radiation. Suitable alkaline solutions (developers) are aqueous solutions of tetramethyl ammonium hydroxide, generally having a conventional concentration equal to 0.26N, although other concentrations can also be suitable. After developing the pattern, the remaining unexposed portions of the layer, "the pattern," is generally baked (post develop bake) or otherwise dried to remove any remaining developer.

The pattern formed from the photo-imageable compositions of the present invention advantageously have characteristics of both its acrylate-type components and norbornene-type components. That is to say such patterns represent high-resolution images of the mask employed and exhibit high selectivity during plasma etching processes such as can be used to transfer such pattern to an underlying material layer disposed over the substrate. Thus, embodiments of the photo-imageable compositions of the present invention can be used to create patterned material layer structures such as metal wiring lines, holes for contacts or vias, insulation sections (e.g., damascene trenches or shallow trench isolation), trenches for capacitor structures, etc. as might be used in the design of integrated circuit devices.

The various aspects of the invention will be appreciated more fully in light of the following illustrative examples:

EXAMPLE 1

Homopolymerization of Methyl Acrylate: [(1,5-cyclooctadiene)Pd(Me)-(Cl)]/PPh$_3$/methyl acrylate in CH$_2$Cl$_2$ In a glove box, under an inert atmosphere (nitrogen), [(1,5-cyclooctadiene)Pd-(Me)(Cl)] (0.020 g, 7.56×10$^{-5}$ mol) was placed into a 25 mL round bottom flask. To this was added 1 equivalent of PPh$_3$ (0.020 g, 7.56×10$^{-5}$ mol), followed by 3 mL of CH$_2$Cl$_2$, and the mixture was gently swirled to dissolve the starting materials and to form a clear, colorless solution. Next, 1 g (1.2×10$^{-2}$ mol) of methyl acrylate was added to the solution and the flask was sealed with a rubber septum and placed in a 50° C. oil bath for 24 hours. Polymer product was obtained by precipitating in methanol, then decanting off liquid and drying under reduced pressure at room temperature. The polymer product was Soxhlet extracted in ether for 16 hours and dried under a vacuum. 0.910 g of polymer product was obtained. The product had a number average molecular weight (M$_n$)=510,000 and a molecular weight distribution (M$_w$/M$_n$, where M$_w$ is the weight average molecular weight)=1.3.

EXAMPLE 2

Homopolymerization of Norbornene: [(1,5-cyclooctadiene)Pd(Me)-(Cl)]/PPh$_3$/norbornene in benzene In a glove box, under an inert atmosphere (nitrogen), [(1,5-cyclooctadiene)Pd-(Me)(Cl)](0.020 g, 7.56×10$^{-5}$ mol) was placed into a 25 mL round bottom flask. To this was added 1 equivalent of PPh$_3$ (0.020 g, 7.56×10$^{-5}$ mol), followed by 3 mL of benzene, and the mixture was gently swirled to dissolve the starting materials and to form a clear, colorless solution. Next, 1 g (1.06×10$^{-2}$ mol) of norbornene was added to the solution, which changed to transparent yellow in appearance. The flask was then sealed with a rubber septum and placed in a 50° C. oil bath for 24 hours. Polymer product was obtained by precipitating in methanol, then decanting off liquid and drying under reduced pressure at room temperature, 0.983 g of polymer product was obtained. The product had a number average molecular weight (M$_n$)=2,000.

EXAMPLE 3

Homopolymerization of Methyl Acrylate: [(1,5-cyclooctadiene)Pd-(Me)(Cl)]PCy$_3$/methyl acrylate in CH$_2$Cl$_2$ The procedure of Example 1 was followed, except that PCy$_3$ (0.21 g, 7.56×10$^{-5}$ mol) was added to the reaction flask instead of PPh$_3$. 0.784 g of polymer product was obtained.

EXAMPLE 4

Homopolymerization of Norbornene: [(1,5-cyclooctadiene)Pd(Me)-(Cl)]/PCy$_3$/norbornene in benzene The procedure of Example 2 was followed, except that PCy$_3$ (0.21 g, 7.56×10$^{-5}$ mol) was added to the reaction flask instead of PPh$_3$. 0.803 g of polymer product was obtained.

EXAMPLE 5

Homopolymerization of Methyl Acrylate: [(1,5-cyclooctadiene)Pd(Me)(Cl)]/PMe$_3$/methyl acrylate in CH$_2$Cl$_2$ The procedure of Example 1 was followed, except that one drop of a 1M solution PMe$_3$ in toluene was added to the reaction flask instead of PPh$_3$. 0.420 g of polymer product was obtained.

EXAMPLE 6

Homopolymerization of Norbornene: [(1,5-cyclooctadiene)Pd(Me)-(Cl)]/PMe$_3$/norbornene in benzene The procedure of Example 2 was followed, except that one drop of a 1M solution of PMe$_3$ in toluene was added to the reaction flask instead of PPh$_3$. 0.861 g of polymer product was obtained.

EXAMPLE 7

Homopolymerization of Methyl Acrylate: [(1,5-cyclooctadiene)Pd(Me)(Cl)]/pyridine/methyl acrylate in CH$_2$Cl$_2$ In a glove box, under an inert atmosphere (nitrogen), [(1,5-cyclooctadiene)Pd-(Me) (Cl)] (0.035 g, 1.32×10$^{-4}$ mol) was placed into a 25 mL round bottom flask. To this was added 1 equivalent of pyridine (0.010 g, 1.32×10$^{-4}$ mol), followed by 3 mL of CH$_2$Cl$_2$, and the mixture was gently swirled to dissolve the starting materials and to form a clear, colorless solution. Next, 1 g (1.2×10$^{-2}$ mol) of methyl acrylate was added to the solution and the flask was sealed with a rubber septum and placed in a 50° C. oil bath for 24 hours. Polymer product was obtained by precipitating in methanol, then decanting off liquid and drying under reduced pressure at room temperature, 0.490 g of polymer product was obtained.

EXAMPLE 8

Homopolymerization of Norbornene: [(1,5-cyclooctadiene)Pd(Me)(Cl)]/pyridine/norbornene in benzene In a glove box, under an inert atmosphere (nitrogen), [(1,5-cyclooctadiene)-Pd(Me)(Cl)] (0.035 g, 1.32×10$^{-4}$ mol) was placed into a 25 mL round bottom flask. To this was added 1 equivalent of pyridine (0.010 g, 1.32×10$^{-4}$ mol), followed by 3 mL of benzene, and the mixture was gently swirled to dissolve the starting materials, thus forming a clear, colorless solution. Next, 1 g (1.2×10$^{-2}$ mol) of norbornene was added to the solution, which changed to transparent yellow in appearance. The flask was then sealed with a rubber septum and placed in a 50° C. oil bath for 24 hours. Polymer product was obtained by precipitating in methanol, then decanting off liquid and drying under reduced pressure at room temperature, 0.643 g of polymer product was obtained.

EXAMPLE 9

Copolymer of Methyl Acrylate and Norbornene; [(1,5-cyclooctadiene)Pd(Me)(Cl)]/PPh$_3$/methyl acrylate/norbornene in CH$_2$Cl$_2$ (10:1 methyl acrylate: norbornene)

In a glove box, under an inert atmosphere (nitrogen), [(1,5-cyclooctadiene)-Pd(Me)(Cl)] (0.020 g, 7.56×10$^{-5}$ mol) was placed into a 25 mL round bottom flask. To this was added 1 equivalent of PPh$_3$ (0.020 g, 7.56×10$^{-5}$ mol), followed by 3 mL of CH$_2$Cl$_2$, and the mixture was gently swirled to dissolve the starting materials, thus forming a clear, colorless solution. Next, 1.000 g (1.2×10$^{-2}$ mol) of methyl acrylate and 0.113 g (1.2×10$^{-3}$ mol) of norbornene were dissolved in each other in a beaker, and the resulting solution was added to the flask containing the dissolved [(1,5-cyclooctadiene)Pd(Me)(Cl)] and PPh$_3$. The flask was sealed with a rubber septum and placed in a 50° C. oil bath for 24 hours. Copolymer product was obtained by precipitating in methanol, then decanting off liquid and drying under reduced pressure at room temperature. The copolymer product was Soxhlet extracted in ether for 16 hours and dried under a vacuum to obtain 0.120 g product. The product had a number average molecular weight ($M_n$)=429,700 and a molecular weight distribution ($M_w/M_n$)=2.1.

EXAMPLE 10

Copolymer of Methyl Acrylate and Norbornene; [(1,5-cyclooctadiene)Pd(Me)(Cl)]/PPh$_3$/methyl acrylate/norbornene in CH$_2$Cl$_2$ (5:1 methyl acrylate: norbornene)

The procedure of Example 9 was repeated, except that 0.800 g (9.3×10$^{-3}$ mol) of methyl acrylate and 0.175 g (1.86×10$^{-3}$ mol) of norbornene were added to the reaction solution. 0.630 g of copolymer product was obtained. The product had a number average molecular weight ($M_n$)=380,000 and a molecular weight distribution ($M_w/M_n$)=2.0.

EXAMPLE 11

Copolymer of Methyl Acrylate and Norbornene: [(1,5-cyclooctadiene)Pd(Me)(Cl)]/PPh$_3$/methyl acrylate/norbornene in CH$_2$Cl$_2$ (1:1 methyl acrylate: norbornene)

The procedure of Example 9 was repeated, except that 1.000 g (1.2×10$^{-2}$ mol) of methyl acrylate and 1.130 g (1.2×10$^{-2}$ mol) of norbornene were added to the reaction solution. 0.770 g of copolymer product was obtained. The product had a number average molecular weight ($M_n$)=60,400 and a molecular weight distribution ($M_w/M_n$)=1.7. The product had a molar ratio of methyl methacrylate:norbornene of 1:0.27 (~21.2 mole % norbornene), as determined by $^1$H NMR integration.

EXAMPLE 12

Copolymer of Methyl Acrylate and Norbornene: [(1,5-cyclooctadiene)Pd(Me)(Cl)]/PPh$_3$/methyl acrylate/norbornene in CH$_2$Cl$_2$ (1:5 methyl acrylate: norbornene)

The procedure of Example 9 was repeated, except that 0.183 g (2.13×10$^{-3}$ mol) of methyl acrylate and 1.000 g (1.06×10$^{-2}$ mol) of norbornene were added to the reaction solution. 0.160 g of copolymer product was obtained. The product had a number average molecular weight ($M_n$)=122,000 and a molecular weight distribution ($M_w/M_n$)=1.5. The product had a molar ratio of methyl methacrylate to norbornene of 1:0.54 (~35.1 mole % norbornene), as determined by $^1$H NMR integration.

EXAMPLE 13

Copolymer of Methyl Acrylate and Norbornene: [(1,5-cyclooctadiene)Pd(Me)(Cl)]/PPh$_3$/methyl acrylate/norbornene in CH$_2$Cl$_2$ (1:10 methyl acrylate:norbornene)

The procedure of Example 9 was repeated, except that 0.082 g (9.57×10$^{-4}$ mol) of methyl acrylate and 0.900 g (9.57×10$^{-3}$ mol) of norbornene were added to the reaction solution. 0.130 g of copolymer product was obtained. The product had a number average molecular weight (M$_n$)=274,400 and a molecular weight distribution (M$_w$/M$_n$)=1.5. The product had a molar ratio of methyl methacrylate:norbornene of 1:1.55 (~67.8 mole % norbornene), as determined by $^1$H NMR integration.

EXAMPLE 14

Copolymer of Methyl Acrylate and Norbornene: [(1,5-cyclooctadiene)Pd(Me)(Cl)]/PCy$_3$/methyl acrylate/norbornene in CH$_2$Cl$_2$ (10:1 methyl acrylate:norbornene)

In a glove box, under an inert atmosphere (nitrogen), [(1,5-cyclooctadiene)Pd(Me)(Cl)] (0.020 g, 7.56×10$^{-5}$ mol) was placed into a 25 mL round bottom flask. To this was added 1 equivalent of PCy$_3$ (0.021 g, 7.93×10$^{-5}$ mol), followed by 3 mL of CH$_2$Cl$_2$, and the mixture was gently swirled to dissolve the starting materials, thus forming a clear, colorless solution. Next, 1.500 g (1.7×10$^{-2}$ mol) of methyl acrylate and 0.160 g (1.7×10$^{-3}$ mol) of norbornene were dissolved in each other in a beaker, and the resulting solution was added to the flask containing the dissolved [(1,5-cyclooctadiene)Pd(Me)(Cl)] and PCy$_3$. The flask was sealed with a rubber septum and placed in a 50° C. oil bath for 24 hours. Copolymer product was obtained by precipitating in methanol, then decanting off liquid and drying under reduced pressure at room temperature. The copolymer product was Soxhlet extracted in ether for 16 hours and dried under a vacuum to obtain 0.410 g product. The product had a number average molecular weight (M$_n$)=429,700 and a molecular weight distribution (M$_w$/M$_n$)=2.1. The product had a molar ratio of methyl methacrylate:norbornene of 1:0.09 (~8.3 mole % norbornene), as determined by $^1$H NMR integration.

EXAMPLE 15

Copolymer of Methyl Acrylate and Norbornene: [(1,5-cyclooctadiene)Pd(Me)(Cl)]/PCy$_3$/methyl acrylate/norbornene in CH$_2$Cl$_2$ (5:1 methyl acrylate:norbornene)

The procedure of Example 14 was repeated, except that 1.500 g (1.7×10$^{-2}$ mol) of methyl acrylate and 0.328 g (3.49×10$^{-3}$ mol) of norbornene were added to the reaction solution. 0.440 of copolymer product was obtained. The product had a number average molecular weight (M$_n$)=238,500 and a molecular weight distribution (M$_w$/M$_n$)=1.5. The product had a molar ratio of methyl methacrylate:norbornene of 1:0.11 (~9.9 mole % norbornene), as determined by $^1$H NMR integration.

EXAMPLE 16

Copolymer of Methyl Acrylate and Norbornene: [(1,5-cyclooctadiene)Pd(Me)(Cl)]/PCy$_3$/methyl acrylate/norbornene in CH$_2$Cl$_2$ (1:1 methyl acrylate:norbornene)

The procedure of Example 14 was repeated, except that 1.00 g (1.2×10$^{-2}$ mol) of methyl acrylate and 1.140 g (1.2×10$^{-2}$ mol) of norbornene were added to the reaction solution. 0.480 g of copolymer product was obtained. The product had a number average molecular weight (M$_n$)=39,800 and a molecular weight distribution (M$_w$/M$_n$)=1.8. The product had a molar ratio of methyl methacrylate:norbornene of 1:0.34 (~25.7 mole % norbornene), as determined by $^1$H NMR integration.

EXAMPLE 17

Copolymer of Methyl Acrylate and Norbornene: [(1,5-cyclooctadiene)Pd(Me)(Cl)]/PCy$_3$/methyl acrylate/norbornene in CH$_2$Cl$_2$ (1:5 methyl acrylate:norbornene)

The procedure of Example 14 was repeated, except that 0.183 g (2.13×10$^{-3}$ mol) of methyl acrylate and 1.000 g (1.06×10$^{-2}$ mol) of norbornene were added to the reaction solution. 0.160 g of copolymer product was obtained. The product had a number average molecular weight (M$_n$)=24,000 and a molecular weight distribution (M$_w$/M$_n$)=1.5.

EXAMPLE 18

Copolymer of Methyl Acrylate and Norbornene: [(1,5-cyclooctadiene)Pd(Me)(Cl)]/PCy$_3$/methyl acrylate/norbornene in CH2Cl2 (1:10 methyl acrylate:norbornene)

The procedure of Example 14 was repeated, except that 0.137 g (1.60×10$^{-3}$ mol) of methyl acrylate and 1.500 g (1.6×10$^{-2}$ mol) of norbornene were added to the reaction solution. 0.040 g of copolymer product was obtained. The product had a number average molecular weight (M$_n$)=1,000.

EXAMPLE 19

Copolymer of Methyl Acrylate and Norbornene: [(1,5-cyclooctadiene)Pd(Me)(Cl)]/PMe$_3$/methyl acrylate/norbornene in CH$_2$Cl$_2$ (10:1 methyl acrylate:norbornene)

In a glove box, under an inert atmosphere (nitrogen), [(1,5 cyclooctadiene)Pd(Me)(Cl)] (0.020 g, 7.56×10$^{-5}$ mol) was placed into a 25 mL round bottom flask. To this was added 1 drop of 1M PMe$_3$ in toluene, followed by 3 mL of CH$_2$Cl$_2$. The mixture was gently swirled to dissolve the starting materials, thus forming a clear, colorless solution. Next, 1.500 g (1.7×10$^{-2}$ mol) of methyl acrylate and 0.160 g (1.7×10$^{-3}$ mol) of norbornene were dissolved in each other in a beaker, and the resulting solution was added to the flask containing the [(1,5-cyclooctadiene)Pd(Me)(Cl)] and PMe$_3$. The flask was sealed with a rubber septum and placed in a 50° C. oil bath for 24 hours. Copolymer product was obtained by precipitating in methanol, then decanting off liquid and drying under reduced pressure at room temperature. The copolymer product was Soxhlet extracted in ether for 16 hours and dried under a vacuum. 0.230 g of copolymer product was obtained. The product had a number average molecular weight $(M_n)$=363,700 and a molecular weight distribution $(M_w/M_n)$=1.4.

EXAMPLE 20

Copolymer of Methyl Acrylate and Norbornene: [(1,5-cycloooetadiene)Pd(Me)(Cl)]/PMe$_3$/methyl acrylate/norbornene in CH$_2$Cl$_2$ (5:1 methyl acrylate: norbornene)

The procedure of Example 19 was repeated, except that 1.500 g ($1.7 \times 10^{-2}$ mol) of methyl acrylate and 0.328 g ($3.49 \times 10^{-3}$ mol) of norbornene were added to the reaction solution. 0.440 g of copolymer product was obtained. The product had a number average molecular weight $(M_n)$=249,500 and a molecular weight distribution $(M_w/M_n)$=1.6.

EXAMPLE 21

Copolymer of Methyl Acrylate and Norbornene: [(1,5-cyclooctadiene)Pd(Me)(Cl)]/PMe$_3$/methyl acrylate/norbornene in CH$_2$Cl$_2$ (1:1 methyl acrylate: norbornene)

The procedure of Example 19 was repeated, except that 1.00 g ($1.2 \times 10^{-2}$ mol) of methyl acrylate and 1.140 g ($1.2 \times 10^{-2}$ mol) of norbornene were added to the reaction solution. 0.480 g of copolymer product was obtained. The product had a number average molecular weight $(M_n)$=86,400 and a molecular weight distribution $(M_w/M_n)$=1.6.

EXAMPLE 22

Copolymer of Methyl Acrylate and Norbornene: [(1,5-cyclooctadiene)Pd(Me)(Cl)]/PMe$_3$/methyl acrylate/norbornene in CH$_2$Cl$_2$ (1:5 methyl acrylate: norbornene)

The procedure of Example 19 was repeated, except that 0.183 g ($2.13 \times 10^{-3}$ mol) of methyl acrylate and 1.000 g ($1.06 \times 10^{-2}$ mol) of norbornene were added to the reaction solution. 0.206 g of copolymer product was obtained. The product had a number average molecular weight $(M_n)$=800.

EXAMPLE 23

Copolymer of Methyl Acrylate and Norbornene: [(1,5-cyclooctadiene)Pd(Me)(Cl)]/PMe$_3$/methyl acrylate/norbornene in CH$_2$Cl$_2$ (1:10 methyl acrylate:norbornene)

The procedure of Example 14 was repeated, except that 0.137 g ($1.60 \times 10^{-3}$ mol) of methyl acrylate and 1.500 g ($1.6 \times 10^{-2}$ mol) of norbornene were added to the reaction solution. 0.040 g of copolymer product was obtained. The product had a number average molecular weight $(M_n)$=800.

EXAMPLE 24

Copolymer of Methyl Acrylate and Norbornene: [(1,5-cyclooctadiene)Pd(Me)(Cl)]/pyridine/methyl acrylate/norbornene in CH$_2$Cl$_2$ (10:1 methyl acrylate:norbornene)

In a glove box, under an inert atmosphere (nitrogen), [(1,5-cyclooctadiene)Pd(Me)(Cl)] (0.035 g, $1.32 \times 10^{-4}$ mol) was placed into a 25 mL round bottom flask. To this was added 1 equivalent of pyridine (0.010 g, $1.32 \times 10^{-4}$ mol), followed by 3 mL of CH$_2$Cl$_2$. The mixture was gently swirled to dissolve the starting materials, thus forming a clear, colorless solution. Next, 1.500 g ($1.7 \times 10^{-2}$ mol) of methyl acrylate and 0.160 g ($1.7 \times 10^{-3}$ mol) of norbornene were dissolved in each other in a beaker, and the resulting solution was added to the flask containing the dissolved [(1,5-cyclooctadiene)Pd(Me)(Cl)] and pyridine. The flask was sealed with a rubber septum and placed in a 50° C. oil bath for 24 hours. Copolymer product was obtained by precipitating in methanol, then decanting off liquid and drying under reduced pressure at room temperature. The copolymer product was Soxhlet extracted in ether for 16 hours and dried under a vacuum. The product had a number average molecular weight $(M_n)$=23,800 and a molecular weight distribution $(M_w/M_n)$=1.8.

EXAMPLE 25

Copolymer of Methyl Acrylate and Norbornene: [(1,5-cyclooctadiene)Pd(Me)(Cl)]/pyridine/methyl acrylate/norbornene in CH$_2$Cl$_2$ (5:1 methyl acrylate:norbornene)

The procedure of Example 25 was repeated, except that 1.500 g ($1.7 \times 10^{-2}$ mol) of methyl acrylate and 0.328 g ($3.49 \times 10^{-3}$ mol) of norbornene were added to the reaction solution. 0.046 g of copolymer product was obtained. The product had a number average molecular weight $M_n)$=75,300 and a molecular weight distribution $(M_w/M_n)$=1.4.

EXAMPLE 26

Copolymer of Methyl Acrylate and Norbornene: [(1,5-cyclooctadiene)Pd(Me)(Cl)]/pyridine/methyl acrylate/norbornene in CH$_2$Cl$_2$ (1:1 methyl acrylate:norbornene)

The procedure of Example 25 was repeated, except that 1.00 g ($1.2 \times 10^{-2}$ mol) of methyl acrylate and 1.140 g ($1.2 \times 10^{-2}$ mol) of norbornene were added to the reaction solution. The product had a number average molecular weight $(M_n)$=8,400 and a molecular weight distribution $(M_w/M_n)$=2.0. The product had a molar ratio of methyl methacrylate:norbornene of 1:0.23 (~18.7 mole % norbornene), as determined by $^1$H NMR integration.

EXAMPLE 27

Copolymer of Methyl Acrylate and Norbornene: [(1,5-cyclooctadiene)Pd(Me)(Cl)]/pyridine/methyl acrylate/norbornene in CH$_2$Cl$_2$ (1:5 methyl acrylate:norbornene)

The procedure of Example 25 was repeated, except that 0.183 g ($2.13 \times 10^{-3}$ mol) of methyl acrylate and 1.000 g ($1.06 \times 10^{-2}$ mol) of norbornene were added to the reaction solution. 0.086 g of copolymer product was obtained. The product had a number average molecular weight $(M_n)$=75,200 and a molecular weight distribution $(M_w/M_n)$=1.5. The product had a molar ratio of methyl methacrylate:norbornene of 1:0.57 (~36.3 mole % norbornene), as determined by $^1$H NMR integration.

EXAMPLE 28

Copolymer of Methyl Acrylate and Norbornene: [(1,5-cyclooctadiene)Pd(Me)(Cl)]/pyridine/methyl acrylate/norbornene in $CH_2Cl_2$ (1:10 methyl acrylate:norbornene)

The procedure of Example 25 was repeated, except that 0.082 g ($9.57\times10^{-4}$ mol) of methyl acrylate and 1.000 g ($1.06\times10^{-2}$ mol) of norbornene were added to the reaction solution. 0.072 g of copolymer product was obtained. The product had a number average molecular weight ($M_n$)=26,100 and a molecular weight distribution ($M_w/M_n$)=1.7. The product had a molar ratio of methyl methacrylate:norbornene of 1:0.71 (~41.5 mole % norbornene), as determined by $^1H$ NMR integration.

EXAMPLE 29

Homopolymerization of n-Butyl Acrylate: [(1,5-cyclooctadiene)Pd(Me)(Cl)]/$PPh_3$/n-butyl acrylate in chlorobenzene In a glove box, under an inert atmosphere (nitrogen), [(1,5-cyclooctadiene)Pd(Me)(Cl)] (0.020 g, $7.56\times10^{-5}$ mol) was placed into a 25 mL round bottom flask. To this was added 1 equivalent of $PPh_3$ (0.020 g, $7.56\times10^{-5}$ mol), followed by 3 mL of chlorobenzene ($C_6H_5Cl$), and the mixture was gently swirled to dissolve the starting materials, thus forming a clear, colorless solution. Next, 2 g of n-butyl acrylate was added to the solution and the flask was sealed with a rubber septum and placed in a 50° C. oil bath for 24 hours. 0.420 g of polymer product was obtained by precipitating in methanol, then decanting off liquid and drying under reduced pressure at room temperature. The product had a number average molecular weight ($M_n$)=627,000 and a molecular weight distribution ($M_w/M_n$)=1.2.

EXAMPLE 30

Copolymerization of n-Butyl Acrylate and Norbornene: [(1,5-cyclooctadiene)Pd(Me)(Cl)]/$PPh_3$/n-butyl acrylate/norbornene in chlorobenzene (1:1.36 n-butyl acrylate:norbornene)

In a glove box, under an inert atmosphere (nitrogen), [(1,5-cyclooctadiene)Pd(Me)(Cl)] (0.020 g, $7.56\times10^{-5}$ mol) was placed into a 25 mL round bottom flask. To this was added 1 equivalent of $PPh_3$ (0.020 g, $7.56\times10^{-5}$ mol), followed by 3 mL of chlorobenzene, and the mixture was gently swirled to dissolve the starting materials, thus forming a clear, colorless solution. Next, 1.000 g ($7.81\times10^{-3}$ mol) of n-butyl acrylate and 1.000 g ($1.06\times10^{-2}$ mol) of norbornene were added to the solution. The flask was then sealed with a rubber septum and placed in a 50° C. oil bath for 24 hours. 0.356 g of copolymer product was obtained by precipitating in methanol, and then decanting off liquid and drying under reduced pressure at room temperature. The product had a number average molecular weight ($M_n$)=267,800 and a molecular weight distribution ($M_w/M_n$)=1.5.

EXAMPLE 31

Homopolymerization of t-Butyl Acrylate: [(1,5-cyclooctadiene)Pd(Me)(Cl)]/$PPh_3$/t-butyl acrylate in chlorobenzene In a glove box, under an inert atmosphere (nitrogen), [(1,5-cyclooctadiene)-Pd(Me)(Cl)] (0.020 g, 7.56x10-5 mol) was placed into a 25 mL round bottom flask. To this was added 1 equivalent of PPh3 (0.020 g, 7.56x10-5 mol), followed by 3 ML of chlorobenzene (C6H5Cl), and the mixture was gently swirled to dissolve the starting materials, thus forming a clear, colorless solution. Next, 1.000 g (7.81x10-3 mol) of t-butyl acrylate was added to the solution and the flask was sealed with a rubber septum and placed in a 50o C. oil bath for 24 hours. Polymer product was obtained by precipitating in methanol, and then decanting off liquid and drying under reduced pressure at room temperature. The product had a number average molecular weight ($M_n$)=550,000 and a molecular weight distribution (Mw/Mn)=1.2.

EXAMPLE 32

Copolymerization of t-Butyl Acrylate and Norbornene: [(1,5-cyclo-octadiene)Pd(Me)(Cl)]/$PPh_3$/t-butyl acrylate/norbornene in chlorobenzene (1:1 t-butyl acrylate:norbornene)

In a glove box, under an inert atmosphere (nitrogen), [(1,5-cyclooctadiene)Pd(Me)(Cl)] (0.020 g, $7.56\times10^{-5}$ mol) was placed into a 25 mL round bottom flask. To this was added 1 equivalent of $PPh_3$ (0.020 g, $7.56\times10^{-5}$ mol), followed by 3 ML of chlorobenzene, and the mixture was gently swirled to dissolve the starting materials, thus forming a clear, colorless solution. Next, 1.000 g ($7.81\times10^{-3}$ mol) of t-butyl acrylate and 1.000 g ($1.06\times10^{-2}$ mol) of norbornene were added to the solution. The flask was then sealed with a rubber septum and placed in a 50° C. oil bath for 24 hours. Copolymer product was obtained by precipitating in methanol, then decanting off liquid and drying under reduced pressure at room temperature

EXAMPLE 33

Homopolymerization of n-Butyl Acrylate: [(1,5-cyclooctadiene)Pd(Me)(Cl)]/$PPh_3$/n-butyl acrylate in hexane In a glove box, under an inert atmosphere (nitrogen), [(1,5-cyclooctadiene)-Pd(Me)(Cl)] (0.020 g, $7.56\times10^{-5}$ mol) was placed into a 25 mL round bottom flask. To this was added 1 equivalent of $PPh_3$ (0.020 g, $7.56\times10^{-5}$ mol), followed by 3 mL of hexane ($C_6H_{14}$), and the mixture was gently swirled to dissolve the starting materials, thus forming a clear, colorless solution. Next, 2 g ($1.56\times10^{-2}$ mol) of butyl acrylate was added to the solution and the flask was sealed with a rubber septum and placed in a 50° C. oil bath for 24 hours. Polymer product was obtained by precipitating in methanol, then decanting off liquid and drying under reduced pressure at room temperature. The product had a number average molecular weight ($M_n$)=127,000 and a molecular weight distribution ($M_w/M_n$)=1.3.

EXAMPLE 34

Homopolymerization of Methyl Acrylate: [(1,5-cyclooctadiene)Pd(Me)(Cl)]/$PPh_3$/methyl methacrylate in benzene In a glove box, under an inert atmosphere (nitrogen), [(1,5-cyclooctadiene)-Pd(Me)(Cl)] (0.020 g, $7.56\times10^{-5}$ mol) was placed into a 25 mL round bottom flask. To this was added 1 equivalent of $PPh_3$ (0.020 g, $7.56\times10^{-5}$ mol), followed by 3 mL of benzene ($C_6H_6$), and the mixture was gently swirled to dissolve the starting materials, thus forming a clear, colorless solution. Next, 2 g of methyl methacrylate was added to the solution and the flask was sealed with a rubber septum stirred at 50° C. for 24 hours. Polymer product was obtained by precipitating in methanol, then decanting off liquid and drying under reduced pressure at room temperature. 0.025 g of polymer product was obtained. The product had a number average molecular weight $(M_n)=193,000$ and a molecular weight distribution $(M_w/M_n)=1.5$.

EXAMPLE 35

Homopolymerization of Ethyl Acrylate: [(1,5-cyclooctadiene)Pd(Me)(Cl)]/PPh$_3$/ethyl acrylate in CH$_2$Cl$_2$ In a glove box, under an inert atmosphere (nitrogen), [(1,5-cyclooctadiene)-Pd(Me)(Cl)](0.020 g, 7.56×10$^{-5}$ mol) was placed into a 25 mL round bottom flask. To this was added 1 equivalent of PPh$_3$ (0.020 g, 7.56×10$^{-5}$ mol), followed by 3 mL of dichloromethane (CH$_2$Cl$_2$), and the mixture was gently swirled to dissolve the starting materials, thus forming a clear, colorless solution. Next, 2 g (2.0×10$^{-2}$ mol) of ethyl acrylate was added to the solution and the flask was sealed with a rubber septum stirred at 50° C. for 24 hours. Polymer product was obtained by precipitating in methanol, then decanting off liquid and drying under reduced pressure at room temperature. 0.837 g of polymer product was obtained. The product had a number average molecular weight $(M_w/M_n)=127,000$ and a molecular weight distribution $(M_n)=1.3$.

EXAMPLE 36

Copolymerization of t-butyl acrylate and Norbornene: [(1,5-cyclooctadiene)Pd(Me)(Cl)/PPh3]/t-butyl acrylate/norbornene in chlorobenzene (1:1 t-butyl acrylate:norbornene)

In a glove box, under an inert atmosphere (nitrogen),: [(1,5-cyclooctadiene) Pd(Me)(Cl) (0.097 g, 0.367 mmol) was placed into a 100 mL crimp cap vial. To this was added 1 equivalent of PPh$_3$ (0.1009, 0.378 mmol) followed by 5 mL of chlorobenzene, and the mixture was gently stirred to dissolve the starting materials, thus forming a clear colorless solution. Next 5.1 g, (39.05 mmol) of t-butyl acrylate and 5.0 g (53.0 mmol) of norbornene were added to the solution. The flask was then sealed with a crimp cap and placed in a 50° C. oil bath for 24 hours. The copolymer product was obtained by precipitating into methanol, then decanting off liquid and drying under reduced pressure at room temperature.

EXAMPLE 37

Copolymerization of methyl acrylate and Bicyclo [2.2.1]heptane-2-carboxylic acid t-butyl ester, with [Pd(Me)(Cl)/PCy$_3$/LiB(C$_6$F$_5$)$_4$.2.5 Et$_2$O]

To a thick walled septum sealed glass vial, equipped with a magnetic stir bar was added the bicyclo[2.2.1]heptane-2-carboxylic acid, t-butyl ester (10.0 g, 51.47 mmol), toluene (40 mL), 2,6 di-t-butylpyridine (0.097 g, 0.52 mmol) (to prevent cleavage of the ester group, and subsequent liberation of isobutylene) and methacrylate (4.62 g, 51.46 mmol). Thereafter was added tricyclohexylphosphine (28 mg, 0.102 mmol) premixed with (cyclooctadiene)palladium(methyl) chloride, in toluene (5 mL), followed by lithium tetrakis (pentafluorophenyl) boron etherate (0.178 g, 0.206 mmol) in toluene (5 mL). The resulting stirred solution was placed in a heated oil bath at 50° C. for a total of 18 hours. After 18 hours the polymer was precipitated by pouring the reaction mixture into excess methanol (200 mL) filtered and washed with excess methanol prior to drying to a constant weight under vacuum at 80° C. Yield 0.77 g.

EXAMPLE 38

Copolymerization of isobornyl acrylate and bicyclo[2.2.1]heptane-2-carboxylic acid t-butyl ester using 2,2'azobisisobutyronitrile (AIBN)

To a thick walled septum sealed glass vial, equipped with a magnetic stir bar was added isobornyl acrylate (2.5 g, 12.87 mmol), and bicyclo[2.2.1]heptane-2-carboxylic acid, t-butyl ester (6.99 g, 34 mmol). A solution of 0.0949 g (0.578 mmol) of 2,2'azobisisobutyronitrile (AIBN) in 5 mL of chlorobenzene was prepared and added to the monomer mixture. The vessel was crimp capped and immersed into an oil bath at 88° C. with stirring for 24 hours. The resultant product was precipitated by adding drop wise into excess methanol (200 mL). The product was collected from a filter and dried in a vacuum oven overnight at 60° C. Yield was 3.2 g.

EXAMPLE 39

Copolymerization of methyl acrylate and bicyclo[2.2.1]heptane-2-carboxylic acid t-butyl ester with 2,2'azobisisobutyronitrile (AIBN)

Methyl acrylate (2.5 g, 0.028 mmol) was added to a round bottom flask with bicyclo[2.2.1]heptane-2-carboxylic acid, t-butyl ester (1.85 g, 0.0095 mol). 2,2'azobisisobutyronitrile (AIBN) was added (0.05 g, 0.32 mmol). The flask was sealed and purged with dry nitrogen then heated to 80° C. for 10 minutes. Molecular weights were determined by GPC: Mw=37,100, Mn=5470. Incorporation of bicyclo[2.2.1]hept-5-ene-2-carboxylic acid, t-butyl ester was determined to be approximately 5 percent based on $^1$H NMR measurements.

EXAMPLE 40

Copolymerization of t-butyl acrylate and bicyclo[2.2.1]hept-5-ene-2-carboxylic acid ethyl ester, using benzenemethanamine A round bottom flask was charged with t-butyl acrylate (2.56 g, 20 mmol) and bicyclo[2.2.1]hept-5-ene-2-carboxylic acid, ethyl ester (3.0 g, 18 mmol). The flask was purged with nitrogen for 10 minutes. Benzenemethanamine, N-(1, 1-dimethylethyl)-α-(1-methylethyl)-N-1-phenylethoxy (0.065 g, 0.20 mmol) was added and the flask was and heated to 90° C. for 1 hour. Molecular weights were determined by GPC: Mw=26700, Mn=10100. Incorporation of bicyclo[2.2.1]hept-5-ene-2-carboxylic acid, ethyl ester was determined to be approximately 24 percent based on $^1$H NMR measurements.

FORMULATION AND IMAGING

Photoimageable Composition Formulation:
The polymers obtained in Examples 36, 37 and 38 were each formulated into a Photoimageable Composition by introducing 1.0 g of polymer sample into a 5 mL screw cap vial. To this sample was added 0.05 g of photo acid generator (PAG) CGI 1397 acquired from CIBA Specialty Chemicals. This mixture was then dissolved in enough Propylene glycol methyl ether acetate (PGMEA) to form a 20% solution. The solution was allowed to stir for 2 hours, and then filtered through a 0.2 μm syringe filter.

The polymers obtained in Examples 39 and 40 were each formulated by introducing 1.0 g of polymer into a 5 mL screw cap vial. To this sample was added 0.05 g of photo acid generator (PAG) CGI 1397 (2-methyl-α-[5-[[(propyl-sulfonyl)oxy]imino]-2(5H)-thienylidene]) acquired from CIBA Specialty Chemicals. A solution of PGMEA containing 0.01 g of 1-chloro-4-propoxy-9H-thioxanethen-9-one was added to the sample. This mixture was then dissolved in enough propylene glycol methyl ether acetate (PGMEA) to form a 20 weight percent solution of polymer. The solution was allowed to stir for 2 hours, and then filtered through a 0.2 μm syringe filter.

Wafer Preparation:

All work was performed in a class 1000 soft wall clean room. Single, flat, 2 inch diameter silicon wafers (<100>) were prepared by base coating the wafer with hexamethyl disilazane (Shin-EtSu) and spin coating to a spin program of 500 rpm for 15 seconds, followed by 2000 rpm for 60 seconds. The wafer was then heated on a hot plate at 130° C. for 60 seconds. The polymer sample was prepared by passing the polymer solution once again through a 0.2 μm syringe filter, and depositing 0.75 mL of the solution described above on to the center of the wafer. A spin program of 500 rpm for 15 seconds followed by 2000 rpm for 60 seconds was used, and then the wafer was soft baked on a hot plate at 130° C. for 120 seconds.

Figure 2:
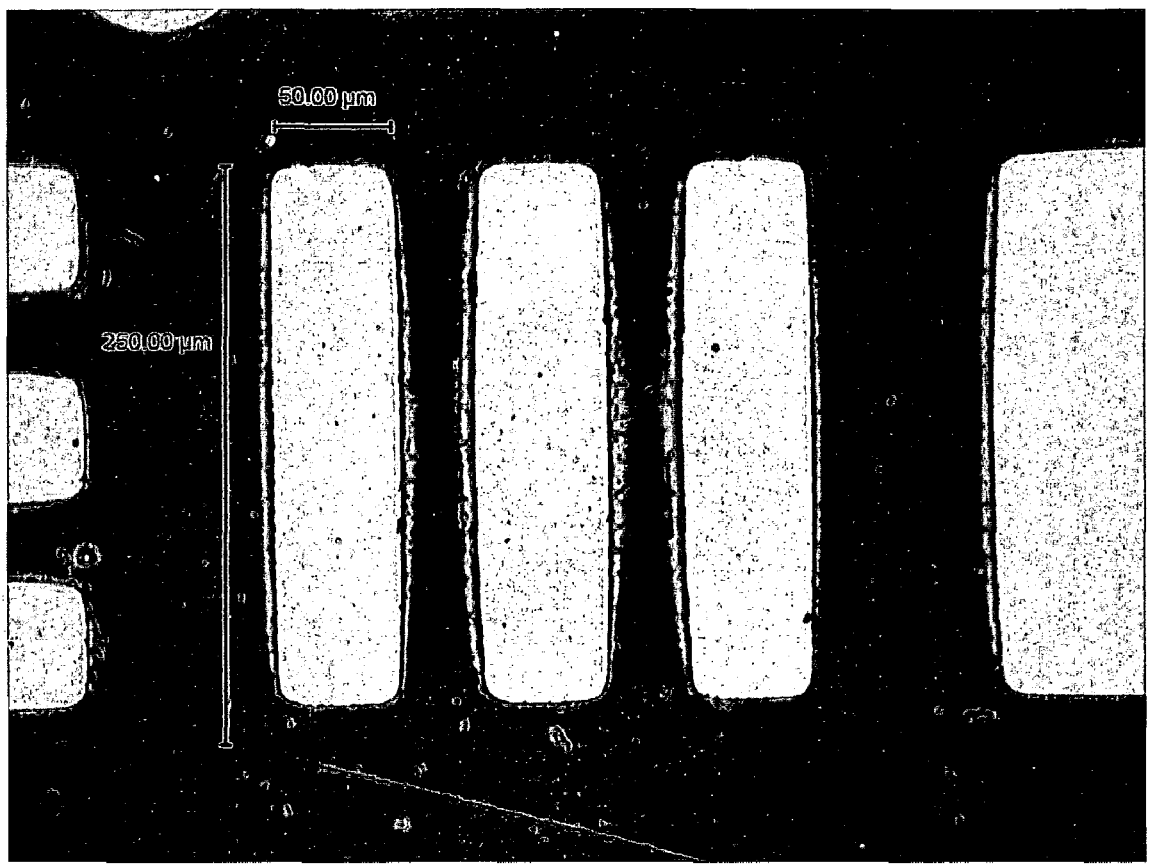
FIG. 2 is a photomicrograph of the photo-imageable composition of Example 37 prepared as described herein below.
Figure 3:
FIG. 3 is a photomicrograph of the photo-imageable composition of Example 38 prepared as described herein below.
Figure 4:
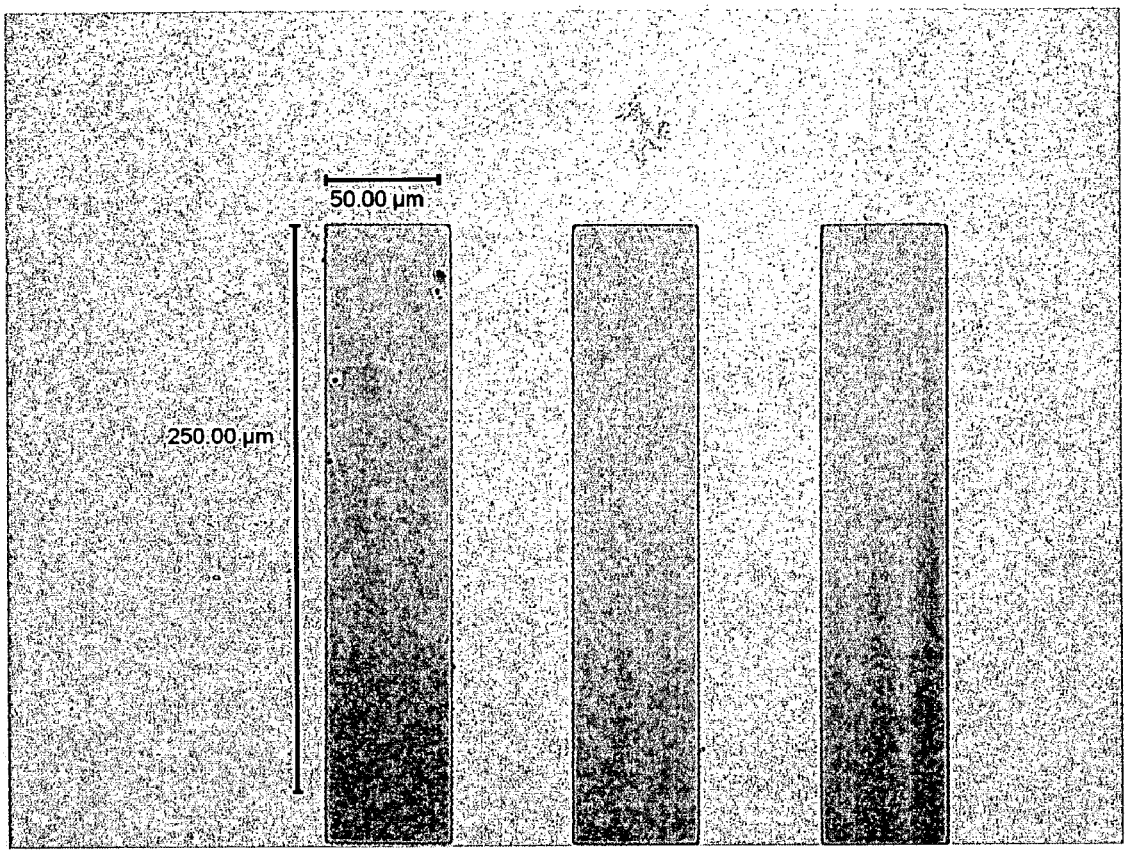
FIG. 4 is a photomicrograph of the photo-imageable composition of Example 39 prepared as described herein below.
Figure 5:
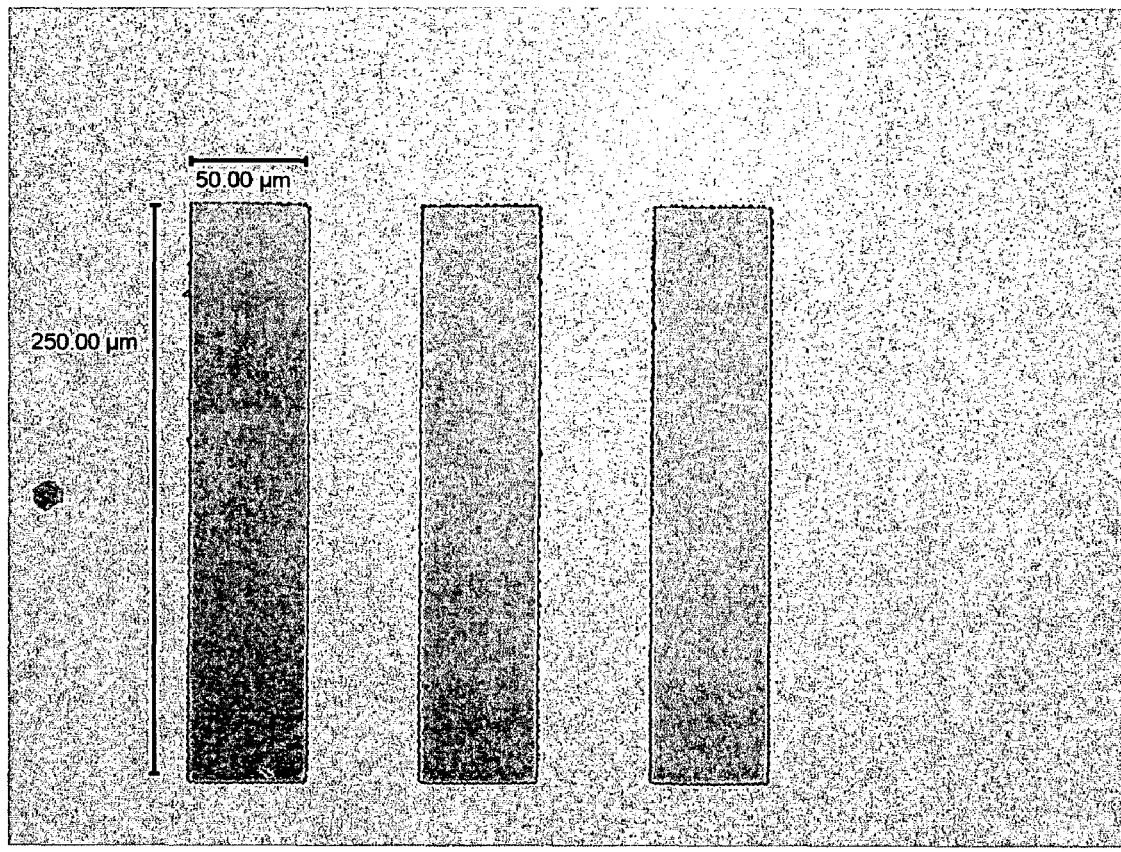
FIG. 5 is a photomicrograph of the photo-imageable composition of Example 40 prepared as described herein below.

Exposure:

The coated wafers were exposed through a mask using the I-line of a mercury vapor light source (365 nm) with an exposure dose of 1002 mj/cm². After exposure, each wafer was post exposure baked on a hot plate set for a temperature of 130° C. for 120 seconds. In each case a latent image was observed. After post exposure bake, the latent image of each wafer was developed by immersion in a solution of tetramethylammonium hydroxide (0.26 N) for 60 seconds, followed by a rinse in deionized water, and drying under a stream of nitrogen. Photomicrographic images (FIGS. 1–5) were prepared using a Nikon optical microscope at a magnification of 2.5×. As seen in each figure, features of 50×250 microns were resolved. As such images demonstrate, each of the compositions prepared in Examples 36–40 are photoimageable.

TABLE 1

| Ex. No. | Ligand | Me Acy/NB Reactant Molar Ratio | $M_n$ (Daltons) | $M_w/M_n$ | Mole % NB |
|---|---|---|---|---|---|
| 9 | PPh$_3$ | 10:1 | 429,700 | 2.1 | — |
| 10 | PPh$_3$ | 5:1 | 380,000 | 2.0 | — |
| 11 | PPh$_3$ | 1:1 | 60,400 | 1.7 | 21.2 |
| 12 | PPh$_3$ | 1:5 | 122,000 | 1.5 | 35.1 |
| 13 | PPh$_3$ | 1:10 | 274,400 | 1.5 | 67.8 |
| 14 | PCy$_3$ | 10:1 | 429,700 | 2.1 | 8.3 |
| 15 | PCy$_3$ | 5:1 | 238,500 | 1.5 | 9.9 |
| 16 | PCy$_3$ | 1:1 | 39,800 | 1.8 | 25.7 |
| 17 | PCy$_3$ | 1:5 | 24,000 | 1.5 | — |
| 18 | PCy$_3$ | 1:10 | 1,000 | — | — |
| 19 | PMe$_3$ | 10:1 | 363,700 | 1.4 | — |
| 20 | PMe$_3$ | 5:1 | 249,500 | 1.6 | — |
| 21 | PMe$_3$ | 1:1 | 86,400 | 1.6 | — |
| 22 | PMe$_3$ | 1:5 | 800 | — | — |
| 23 | PMe$_3$ | 1:10 | 800 | — | — |
| 24 | Pyridine | 10:1 | 23,800 | 1.8 | — |
| 25 | Pyridine | 5:1 | 75,300 | 1.4 | — |
| 26 | Pyridine | 1:1 | 8,400 | 2.0 | 18.7 |
| 27 | Pyridine | 1:5 | 75,200 | 1.5 | 36.3 |
| 28 | Pyridine | 1:10 | 26,100 | 1.7 | 41.5 |

As discussed briefly above, and as will be more readily apparent in view of the foregoing examples, the properties of the copolymers can be tailored by varying the ratio of the respective monomers in the reaction mixture and by varying the catalyst system. Varying the ratio of acrylate monomer to norbornene monomer affects the properties of the copolymers in that increasing the ratio of one of the monomer reactants increases its presence in the copolymer product. In instances of a very high ratio of one monomer relative to the other (for example, in 10:1 and 1:10 monomer ratio reactions) the resulting copolymer product consists of long strings of repeating units of the abundant monomer with a one or more units of the less abundant monomer therebetween. Thus, polymer products having a high acrylate content, e.g., high methyl content, tend to be somewhat tacky, whereas polymers having a high norbornene content are white powdery substances. Varying the ligand used in the reaction and/or varying the reactant monomer ratio also affects the molecular weight of the copolymer product. Thus, referring to the Examples 1–28 and Table 1, it can be seen that the mole % of norbornene in the copolymer product increased as the ratio of acrylate monomer to norbornene monomer in the reaction decreased from 10:1 to 1:1 when PPh$_3$ was used as the ligand (Examples 11–13), when PCy$_3$ was used as the ligand (Examples 14–16), and when pyridine was used as the ligand (Examples 26–28). Similarly, it can be seen that the molecular weight of the copolymer product increased as the ratio of acrylate monomer to norbornene monomer increased from 1:1 to 10:1 when PPh$_3$ was used as the ligand (Examples 9–11), when PCy$_3$ was used as the ligand (Examples 14–16), and when PMe$_3$ was used as the ligand (Examples 19–21). It also can be seen that the use of pyridine as the ligand (Examples 24–28) generally resulted in the production of lower molecular weight copolymers, whereas the use of triphenyl phosphine as the ligand (Examples 9–13) tended to produce higher molecular weight copolymers.

Examples 36–40, as well as Example 31, the homopolymer of t-butyl acrylate, and Example 32, essentially the same copolymer as Example 36, are all photo-imageable. It will be noted that such characteristic is afforded by the inclusion of an acid labile group on at least one or the other of the acrylate-type or norbornene-type monomer used to form the copolymer or homopolymer of each photo-imageable example. Thus in Examples 31, 32, 36 and 40 the acrylate monomer selected encompasses an acid labile moiety and in Examples 37, 38 and 39, the norbornene monomer encompasses an acid labile moiety. It will be understood, therefore, that the photo-imageable compositions of embodiments in accordance with the present invention encompass copolymers where at least one or the other of the acrylate or norbornene monomers from which the copolymer is derived includes an acid labile moiety.

While the present invention has been described and exemplified above, it is to be understood that the invention is not limited to the details of the illustrative embodiments and examples, but may be embodied with various changes and modifications which may occur to those skilled in the art, without departing from the spirit and scope of the invention defined in the following claims. For example, embodiments of the present invention are not limited to copolymers formed of a single acrylate monomer and norbornene monomer. Rather, the teachings herein make it apparent that polymers encompassing more than a single acrylate-type monomer and a single norbornene-type monomer are within the spirit and scope of the present invention. Thus it is taught herein that the selection of specific monomers is useful for the control of, for example, the physical characteristics of the resulting polymer. Therefore it would be apparent to one of ordinary skill in the art that the inclusion of one or more additional monomers, acrylate-type units or norbornene-type units, can be useful for forming a polymer with a set of desired characteristics. Where such polymers having additional monomers are desirable, the formation of such can be effected in several ways. For example, each of the monomers can be combined together initially and the desired polymer formed in a single polymerization reaction or the desired polymer formed using a multi-stage polymerization where a first polymer is first formed and one or more additional monomers are added in one or more additional polymerization reactions.

What is claimed is:

1. A photo-imageable composition comprising an acrylate-norbornene copolymer comprising from about 15 to about 90 mole % acrylate-type units and from about 85 to about 10 mole % norbornene-type units, one or the other of the acrylate-type units or norbornene-type units comprising an acid labile moiety, and where each of said norbornene-type units are 4 substituted, 5 substituted or a mixture thereof.

2. The photo-imageable composition of claim 1, where the norbornene-type units comprise norbornene, norbornadiene and compounds conforming to the general formulae I or Ia:

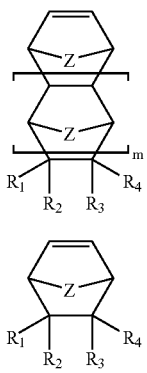

where m is an integer from 0 to 5; and Z represents —$CH_2$—, oxygen, sulfur, or —NH—, where p is equal to 1 or 2; $R_1$ to $R_4$ are substituents independently selected from hydrogen, a halogen, linear or branched ($C_1$ to $C_{30}$)alkyls, linear or branched ($C_1$ to $C_{24}$)halohydrocarbyls, linear or branched ($C_2$ to $C_{30}$)olefins; —$(CH_2)_nC(O)OR^*$, —$(CH_2)_nC(O)OR'$, —$(CH_2)_nOR$, —$(CH_2)_nOC(O)R$, —$(CH_2)_nC(O)R$, —$(CH_2)_nOC(O)OR'$, —$(CH_2)_nC(R)_2CH(R)(C(O)OR^{})$, —$(CH_2)_n(CR_2)nCH(R)(C(O)OR^{})$, —$(CH_2)_nC(OR^{***})(CF_3)_2$, —$(CR''_2)nOR$, —$CH_2$—$[O(CH_2)_n]_{m^*}$—$C(OR^{*})(CF_3)_2$ and —$(CH_2)_nC(R)_2CH(C(O)OR^{})_2$, and where R and R' can be hydrogen or linear and branched ($C_1$ to $C_{10}$)alkyls or hydroxy functional linear and branched ($C_1$ to $C_{10}$)alkyls, R'' can be hydrogen or a halogen; n and m* are each an integer from 0 to 10; R* is an acid labile moiety selected from the group consisting of —$C(CH_3)_3$, —$Si(CH_3)_3$, isobornyl, 2-methyl-2-adamantyl, tetrahydrofuranyl, tetrahydropyranoyl, 3-oxocyclohexanonyl and mevalonic lactonyl groups; R** is an independently selected R' or R*, where R' and R* are as defined above and R* further includes tertiary ($C_4$ to $C_{20}$)alkyl and cycloalkyl groups, tri($C_1$ to $C_6$)alkylsilyl groups and oxoalkyl groups of 4 to 20 carbon atoms; R* includes hydrogen, —$CH_2OR'''$, —$(CH_2)_{m^{}}C(O)OR'''$ or —$C(O)R'''$, where R''' is methyl, ethyl, tert-butyl, cyclopentyl, cyclohexyl or other linear and branched ($C_3$ to $C_{10}$) alkyls and ($C_4$ to $C_{20}$)cycloaliphatics and m** is 0 or 1.

3. The photo-imageable composition of claim 2, further comprising a photo acid generator and a solvent.

4. The photo-imageable composition of claim 3, further comprising at least one of a dissolution rate modifier, a base quencher and/or a sensitizer.

5. The photo-imageable composition of claim 4, where the acrylate-type units and/or the norbornene-type units comprise more than one type of acrylate-type unit and/or norbornene-type unit, respectively, and at least one of the acrylate-type units and/or the norbornene-type units comprise an acid labile moiety.

6. A photo-imageable composition comprising a polymer having from about 15 to about 90 mole % of acrylate-type units and from about 85 to about 10 mole % of norbornene-type units, wherein said norbornene-type units are either 4 substituted or 5 substituted where the acrylate-type units and/or the norbornene-type units comprise more than one type of acrylate-type unit and/or norbornene-type unit, respectively, and at least one of the acrylate-type units and/or the norbornene-type units comprise an acid labile moiety.

7. The photo-imageable composition of claim 6, further comprising one or more additives selected from the group consisting of a photoacid generator, a solvent, a sensitizer, a base quencher and a dissolution rate modifier.

8. A method of forming a photo-imageable composition comprising:

causing an acrylate-type monomer and a norbornene-type monomer, where said norbornene-type monomer is either 4 substituted or 5 substituted, to polymerize to form a polymer, one or the other of the acrylate-type monomer or the norbornene-type monomer comprising an acid labile moiety;

dissolving the polymer in a solvent to form a solution; and adding to the solution an additive selected from the group consisting of a photoacid generator, a solvent, a sensitizer, a base quencher and a dissolution rate modifier.

9. The method of claim 8, where the norbornene-type monomer comprises norbornene, norbornadiene and compounds conforming to the general formulae I or Ia:

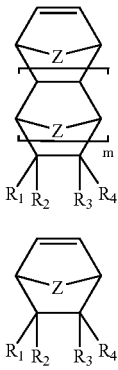

where m is an integer from 0 to 5; and Z represents —CH$_2$, oxygen, sulfur, or —NH—, where p is equal to 1 or 2; R$_1$ to R$_4$ are substituents independently selected from hydrogen, a halogen, linear or branched (C$_1$ to C$_{30}$)alkyls, linear or branched (C$_1$ to C$_{24}$)halohydrocarbyls, linear or branched (C$_2$ to C$_{30}$)olefins; —(CH$_2$)$_n$C(O)OR*, —(CH$_2$)$_n$C(O)OR', —(CH$_2$)$_n$OR, —(CH$_2$)$_n$OC(O)R, —(CH$_2$)$_n$C(O)R, —(CH$_2$)$_n$—OC(O)OR', —(CH$_2$)$_n$C(R)$_2$CH(R)(C(O)OR), —(CH$_2$)$_n$(CR$_2$)$_n$CH(R)(C(O)OR), —(CH$_2$)$_n$C(OR***)(CF$_3$)$_2$, —(CR"$_2$)$_n$OR, —(CR"$_2$)$_n$OR, —[O(CH$_2$)$_n$]$_{m*}$—C(OR*)(CF$_3$)$_2$ and —(CH$_2$)$_n$C(R)$_2$CH(C(O)OR)$_2$, and where R and R' can be hydrogen or linear and branched (C$_1$ to C$_{10}$)alkyls or hydroxy functional linear and branched (C$_1$ to C$_{10}$)alkyls, R" can be hydrogen or a halogen; n and m* are each an integer from 0 to 10; R* is an acid labile moiety selected from the group consisting of —C(CH$_3$)$_3$, —Si(CH$_3$)$_3$, isobornyl, 2-methyl-2-adamantyl, tetrahydrofuranyl, tetrahydropyranoyl, 3-oxocyclohexanonyl and mevalonic lactonyl groups; R** is an independently selected R' or R*, where R' and R* are as defined above and R* further includes tertiary (C$_4$ to C$_{20}$)alkyl and cycloalkyl groups, tri(C$_1$ to C$_6$)alkylsilyl groups and oxoalkyl groups of 4 to 20 carbon atoms; R* includes hydrogen, —CH$_2$OR''', —(CH$_2$)$_{m}$C(O)OR''' or —C(O)R''', where R''' is methyl, ethyl, tert-butyl, cyclopentyl, cyclohexyl or other linear and branched (C$_3$ to C$_{10}$) alkyls and (C$_4$ to C$_{20}$)cycloaliphatics and m** is 0 or 1.

10. The method of claim 9, where the causing to form a polymer comprises an addition polymerization using a neutral or cationic Pd catalyst.

11. The method of claim 10, where the causing to form a polymer comprises forming a polymer having from about 15 to about 90 mole % of acrylate units and from about 85 to about 10 mole % of norbornene units.

12. The method of claim 9, where the causing to form a polymer comprises forming a polymer having from about 15 to about 90 mole % of acrylate units and from about 85 to about 10 mole % of norbornene units, where the acrylate units and/or the norbornene units comprise more than one type of acrylate unit and/or norbornene unit, respectively, and at least one of the types of acrylate units and/or the norbornene units comprise an acid labile moiety.

13. A method of forming a patterned structure on a substrate, comprising:
providing a substrate;
applying a photo-imageable composition to said substrate to form a layer of the photo-imageable composition on said substrate, the photo-imageable composition comprising:
an imageable polymer consisting essentially of from about 15 to about 90 mole % acrylate-type units and from about 85 to about 10 mole % norbornene-type units, one or the other of the acrylate-type units or norbornene-type units comprising an acid labile moiety, and where each of said norbornene-type units are 4 substituted, 5 substituted or a mixture thereof; and
a photo acid generator;
patternwise exposing the layer to radiation whereby acid is generated by said photosensitive acid generator in exposed regions of the layer by the radiation; and
contacting the layer with an aqueous alkaline developer solution, whereby the exposed regions of the layer are selectively dissolved by said developer solution to form the patterned structure.

14. The method of forming a patterned structure of claim 13, further comprising:
before providing the substrate, forming a material layer on the substrate, the material layer comprising a material selected from the group consisting of a semiconductor material, an insulating material and a conductive material;
applying the photo-imageable composition comprises applying the photo-imageable composition on the material layer; and
transferring the patterned structure to the material layer to form a patterned material layer structure.

15. The method of forming a patterned structure of claim 14, where the transferring comprises a reactive ion etch process.

16. The method of forming a patterned structure of claim 14, where the norbornene-type units of the imageable polymer comprise norbornene, norbornadiene and compounds conforming to the general formulae I or Ia:

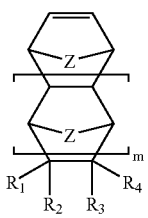

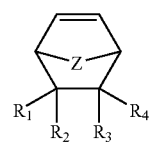

where m is an integer from 0 to 5; and Z represents —CH$_2$, oxygen, sulfur, or —NH—, where p is equal to 1 or 2; R$_1$ to R$_4$ are substituents independently selected from hydrogen, a halogen, linear or branched (C$_1$ to C$_{30}$)alkyls, linear or branched (C$_1$ to C$_{24}$)halohydrocarbyls, linear or branched (C$_2$ to C$_{30}$)olefins; —(CH$_2$)$_n$C(O)OR*, —(CH$_2$)$_n$C(O)OR', —(CH$_2$)$_n$OR, —(CH$_2$)$_n$OC(O)R, —(CH$_2$)$_n$C(O)R, —(CH$_2$)$_n$—OC(O)OR', —(CH$_2$)$_n$C(R)$_2$CH(R)(C(O)OR), —(CH$_2$)$_n$(CR$_2$)nCH(R)(C(O)OR), —(CH$_2$)$_n$C(OR***)(CF$_3$)$_2$, —(CR"$_2$)$_n$OR, —CH$_2$—[O(CH$_2$)$_n$]$_{m*}$—C(OR***)

$-(CF_3)_2$ and $-(CH_2)_nC(R)_2CH(C(O)OR^{**})_2$, and where R and R' can be hydrogen or linear and branched ($C_1$ to $C_{10}$)alkyls or hydroxy functional linear and branched ($C_1$ to $C_{10}$)alkyls, R" can be hydrogen or a halogen; n and $m^*$ are each an integer from 0 to 10; $R^*$ is an acid labile moiety selected from the group consisting of $-C(CH_3)_3$, $-Si(CH_3)_3$, isobornyl, 2-methyl-2-adamantyl, tetrahydrofuranyl, tetrahydropyranoyl, 3-oxocyclohexanonyl and mevalonic lactonyl groups; $R^{**}$ is an independently selected R' or $R^*$, where R' and $R^*$ are as defined above and $R^*$ further includes tertiary ($C_4$ to $C_{20}$)alkyl and cycloalkyl groups, tri($C_1$ to $C_6$)alkylsilyl groups and oxoalkyl groups of 4 to 20 carbon atoms; $R^{*}$ includes hydrogen, $-CH_2OR'''$, $-(CH_2)_{m^{}}C(O)OR'''$ or $-C(O)R'''$, where R''' is methyl, ethyl, tert-butyl, cyclopentyl, cyclohexyl or other linear and branched ($C_3$ to $C_{10}$) alkyls and ($C_4$ to $C_{20}$)cycloaliphatics and $m^{**}$ is 0 or 1.

\* \* \* \* \*